United States Patent
Dulzer et al.

(10) Patent No.: US 7,497,904 B2
(45) Date of Patent: Mar. 3, 2009

(54) LIQUID COLORING SUSPENSION AND COLORED CEMENTITIOUS COMPOSITION

(75) Inventors: Nancy A. Dulzer, Lyndhurst, OH (US); Jeffrey L. Matrician, Chesterland, OH (US); Martin E. Wild, Marietta, GA (US)

(73) Assignees: Construction Research & Technology GmbH, Trostberg (DE); L.M. Scofield Company, Los Angeles, CA (US)

( * ) Notice: Subject to any disclaimer, the term of this patent is extended or adjusted under 35 U.S.C. 154(b) by 617 days.

(21) Appl. No.: 10/811,096

(22) Filed: Mar. 26, 2004

(65) Prior Publication Data

US 2004/0231567 A1   Nov. 25, 2004

Related U.S. Application Data

(60) Provisional application No. 60/458,201, filed on Mar. 27, 2003.

(51) Int. Cl.
- C04B 24/04 (2006.01)
- C04B 24/12 (2006.01)
- C04B 24/16 (2006.01)
- C04B 24/24 (2006.01)

(52) U.S. Cl. ............... 106/712; 106/724; 106/726; 106/727; 106/823; 524/5

(58) Field of Classification Search ............ 106/724, 106/712, 726, 727, 823; 524/5
See application file for complete search history.

(56) References Cited

U.S. PATENT DOCUMENTS

| | | | |
|---|---|---|---|
| 3,980,602 A | | 9/1976 | Jakubauskas |
| 4,004,939 A | * | 1/1977 | O'Brien et al. |
| 4,115,435 A | * | 9/1978 | O'Brien et al. |
| 4,131,480 A | * | 12/1978 | McCurrich et al. |
| 4,494,990 A | * | 1/1985 | Harris |
| 4,514,947 A | | 5/1985 | Grail |
| 4,741,781 A | | 5/1988 | DeWitte |
| 5,215,583 A | | 6/1993 | Krockert et al. |
| 5,322,563 A | | 6/1994 | van Bonn et al. |
| 5,585,427 A | | 12/1996 | Schimmel et al. |
| 5,691,292 A | * | 11/1997 | Marshall et al. ............ 510/221 |
| 5,760,257 A | | 6/1998 | Tanaka et al. |
| 5,853,476 A | | 12/1998 | Will |
| 5,855,665 A | | 1/1999 | Johansen et al. |
| 5,961,710 A | | 10/1999 | Linde et al. |

(Continued)

FOREIGN PATENT DOCUMENTS

GB   2 065 692 A   7/1981

(Continued)

*Primary Examiner*—Paul Marcantoni
(74) *Attorney, Agent, or Firm*—Curatolo Sidoti Co., LPA; Joseph G. Curatolo; Salvatore A. Sidoti

(57) ABSTRACT

A cementitious composition is provided that is composed of hydraulic cement and a liquid coloring suspension. The liquid coloring suspension which contains polycarboxylate dispersant and pigment provides the cementitious composition with increased dispersion of pigment particles, lowered water content, and improved coloration over that observed in the prior art. Also, a liquid coloring suspension for cementitious compositions is provided which contains polycarboxylate dispersant, pigment, and thixotropic additive. The liquid coloring suspension increases the color of cementitious compositions, reduces the water content and has long term stability in that it does not become increasingly viscous over time.

90 Claims, 3 Drawing Sheets

U.S. PATENT DOCUMENTS

| | | | |
|---|---|---|---|
| 5,989,336 A * | 11/1999 | Carpenter et al. | 106/811 |
| 6,267,814 B1 * | 7/2001 | Bury et al. | 106/727 |
| 6,270,566 B1 | 8/2001 | Rademachers et al. | |
| 6,290,770 B1 * | 9/2001 | Moreau et al. | 106/708 |
| 6,310,143 B1 * | 10/2001 | Vickers, Jr. et al. | 106/823 |
| 6,391,106 B2 * | 5/2002 | Moreau et al. | 106/724 |
| 6,514,595 B1 | 2/2003 | Sprouts | |
| 6,515,062 B2 | 2/2003 | Jesionka | |
| 6,572,697 B2 * | 6/2003 | Gleeson et al. | 106/705 |
| 2002/0019459 A1 | 2/2002 | Albrecht et al. | |
| 2004/0149174 A1 * | 8/2004 | Farrington et al. | 106/802 |
| 2004/0198873 A1 * | 10/2004 | Bury et al. | 524/5 |

FOREIGN PATENT DOCUMENTS

| | | |
|---|---|---|
| WO | WO 97/10308 A | 3/1997 |
| WO | WO 01/40133 A | 6/2001 |
| WO | WO 02/094733 A | 11/2002 |

* cited by examiner

US 7,497,904 B2

LIQUID COLORING SUSPENSION AND COLORED CEMENTITIOUS COMPOSITION

CROSS REFERENCE TO RELATED APPLICATIONS

This application claims the benefit of the filing date of U.S. Provisional Application for Patent Ser. No. 60/458,201 filed Mar. 27, 2003.

BACKGROUND

A pigment, as related to its use in concrete, mortar and cement paste is defined as a fine dry powder, dry granules, aqueous suspension, or slurry, of the powder or granules, insoluble and inert to the concrete ingredients and which imparts a specific color to the product. The color of a pigment can be described in terms of three properties: hue, value, and chroma, which are indicative of the purity (oxide content) and the brightness of the pigment.

Pigments in the dry form exist as agglomerates of particles. The ease with which the aggregates are broken down and dispersed in concrete, mortar and cement paste depends on the extent to which the forces of attraction between the particles is reduced. The coloring action of pigments is dependent on the extent of smearing over the cement and fine aggregate in the mix. Therefore, cement and fine aggregate contents will significantly influence the degree of coloration achieved.

Dosages of pigments typically decrease slump, increase the water demand and premature stiffening of the cementitious composition and may produce flash setting. To increase the slump of the cementitious mixture additional water is added, however, in general the higher the water content of the mix, the lighter will be the final color. The increased water content also decreases the strength of the resulting cementitious composition.

Therefore, it is desirable to provide a colored cementitious composition comprising a liquid coloring suspension which contains a dispersant and a pigment that improves the color, increases or has no effect on slump, and lowers or has no effect on the water demand of the cementitious composition. Therefore, a liquid coloring suspension which improves the color of cementitious compositions without increasing the water content or decreasing slump would be advantageous in the industry.

U.S. Pat. No. 5,853,476 to Will discloses a method for coloring cementitious systems using compacted inorganic granules, wherein the compacted inorganic granules comprise an inorganic pigment and a non-polycarboxylate dispersing agent.

U.S. Pat. No. 4,514,947 to Grail discloses a roof tile made of a composition of matter comprising cement, silica sand, iron oxide pigment, acrylic polymer resin, an antifoaming agent and water and formed into a shape.

U.S. Pat. No. 4,714,781 to De Witte discloses iron oxide slurries and suspensions that are made from water, iron oxide pigments and a non-polycarboxylate dispersing agents such as water soluble salts of citric acid and tartaric acid.

SUMMARY

A method of making a colored cementitious composition without increasing water demand is provided which comprises forming a mixture of hydraulic cement and a liquid coloring suspension, wherein the liquid coloring suspension comprises liquid, polycarboxylate dispersant and pigment.

A colored cementitious composition is provided that comprises a hydraulic cement and a liquid coloring suspension that comprises liquid, polycarboxylate dispersant and pigment, and wherein the liquid coloring suspension improves the color in the cementitious composition without increasing the water demand.

A liquid coloring suspension is provided that comprises polycarboxylate dispersant, pigment and thixotropic additive, wherein the viscosity of the liquid coloring suspension is stable over time.

A colored cementitious composition is provided that comprises hydraulic cement and a liquid coloring suspension that comprises liquid, polycarboxylate dispersant, pigment, and thixotropic additive, wherein the liquid coloring suspension improves the color in the cementitious composition without increasing the water demand.

A method of making a colored cementitious composition without increasing water demand is provided which comprises forming a mixture of hydraulic cement and a liquid coloring suspension, wherein the liquid coloring suspension comprises liquid, polycarboxylate dispersant, pigment and thixotropic additive.

DETAILED DESCRIPTION

Figure 1:
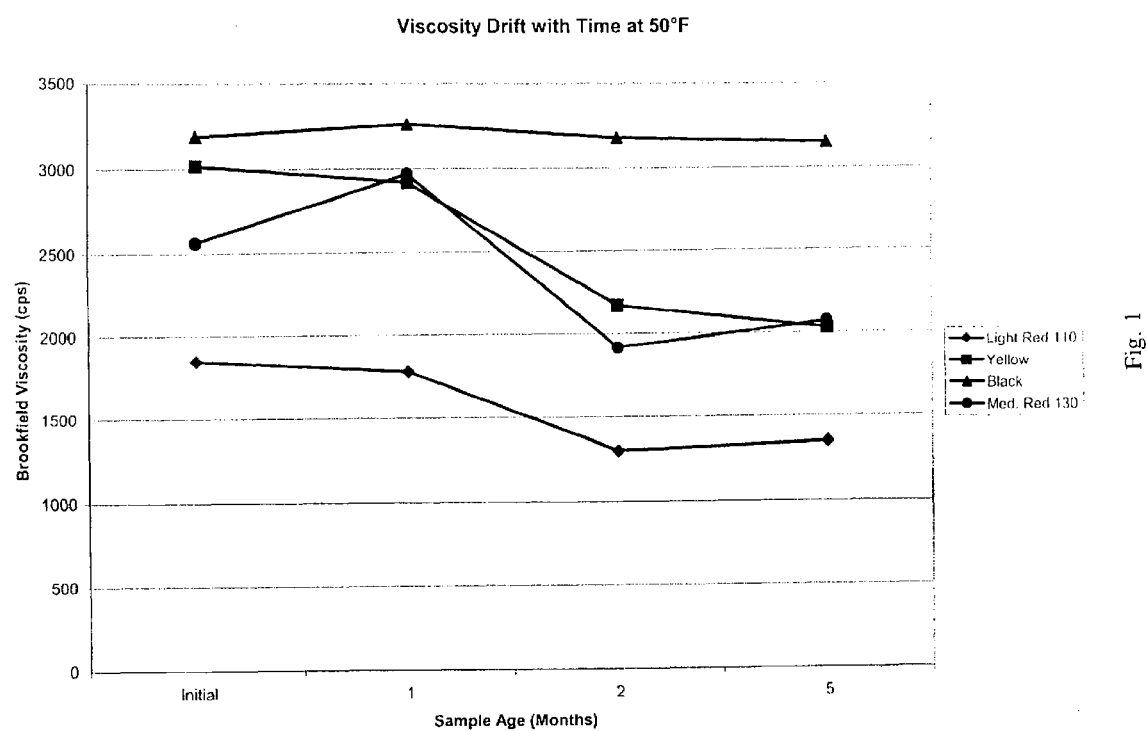
FIG. 1 demonstrates the long term stability of the liquid coloring suspension at 50° F., in that there was no increase in the viscosity of the suspension over time (5 months).

A liquid coloring suspension is provided that has long term stability, reduces the water content and viscosity of cementitious compositions and increases the color by improving pigment dispersion throughout the mixture. A cementitious composition containing the liquid coloring suspension is also provided, as well as a novel method for preparing such a colored cementitious composition.

In contrast to conventional pigmented cementitious formulations, made by mixing hydraulic cement, a pigment dispersant and a powdered pigment or a dispersion thereof, cementitious formulations made by mixing a hydraulic cement and a liquid coloring suspension comprising a dispersion of a polycarboxylate and a pigment, synergistically exhibit water neutrality or decreased, rather than increased water demand. These pigmented cementitious formulations also exhibit excellent compressive strength after set, and no retardation of set compared to a corresponding non-pigmented formulations. The cementitious formulation made according to the present method exhibits increased color strength compared to conventional pigmented concretes.

A colored cementitious composition which has a liquid coloring suspension is provided that has improved color dispersion and a neutral or reduced water content, as well as a novel method for preparing such a colored cementitious composition.

Polycarboxylate dispersants are effective at dispersing cement and reducing the water content in hydraulic cementitious compositions. These dispersants operate by binding to a cement particle and developing both electrostatic and steric repulsive forces, thereby keeping the particles apart, resulting in a more fluid system.

The term polycarboxylate dispersant used throughout this specification refers to polymers with a carbon backbone with pendant side chains, wherein at least a portion of the side chains are attached to the backbone through a carboxyl group or an ether group. The term dispersant is also meant to include those chemicals which also function as a plasticizer, water reducer, fluidizer, antiflocculating agent, or superplasticizer for cementitious compositions. Examples of polycarboxylate dispersants can be found in U.S. Pub. No. 2002/0019459 A1, U.S. Pat. Nos. 6,267,814, 6,290,770, 6,310,143, 6,187,841, 5,158,996, 6,008,275, 6,136,950, 6,284,867, 5,609,681, 5,494,516; 5,674,929,5,660,626, 5,668,195, 5,661,206, 5,358,566, 5,162,402, 5,798,425, 5,612,396, 6,063,184, 5,912,284, 5,840,114, 5,753,744, 5,728,207, 5,725,657, 5,703,174, 5,665,158, 5,643,978, 5,633,298, 5,583,183, and 5,393,343, which are all incorporated herein by reference.

In one embodiment the admixture composition contains about 0.5% to about 3% polycarboxylate dispersant solids based on the total weight of the liquid coloring suspension. In another embodiment the admixture composition contains about 1% to about 2.5% polycarboxylate dispersant solids based on the total weight of the liquid coloring suspension. In another embodiment a cementitious composition contains about 0.0008% to about 0.51% polycarboxylate dispersant solids by dry weight of cementitious binder. In a further embodiment a cementitious composition contains about 0.004% to about 0.25% polycarboxylate dispersant solids by dry weight of cementitious binder.

The polycarboxylate dispersants used in the system can be at least one of the dispersant formulas a) through k):

a) a dispersant of Formula (I):

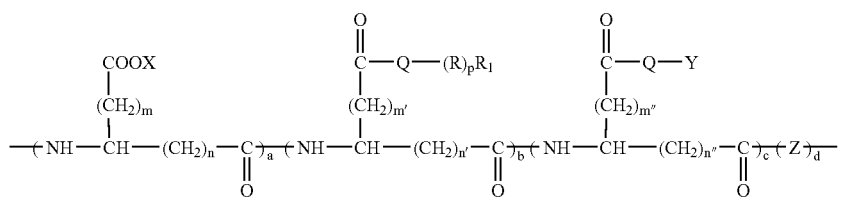

wherein in Formula (I)

X is at least one of hydrogen, an alkali earth metal ion, an alkaline earth metal ion, ammonium ion, or amine;

R is at least one of $C_1$ to $C_6$ alkyl(ene) ether or mixtures thereof or $C_1$ to $C_6$ alkyl(ene) imine or mixtures thereof;

Q is at least one of oxygen, NH, or sulfur;

p is a number from 1 to about 300 resulting in at least one of a linear side chain or branched side chain;

$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;

Y is at least one of hydrogen, an alkali earth metal ion, an alkaline earth metal ion, ammonium ion, amine, a hydrophobic hydrocarbon or polyalkylene oxide moiety that functions as a defoamer;

m, m', m", n, n', and n" are each independently 0 or an integer between 1 and about 20;

Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

b) a dispersant of Formula (II):

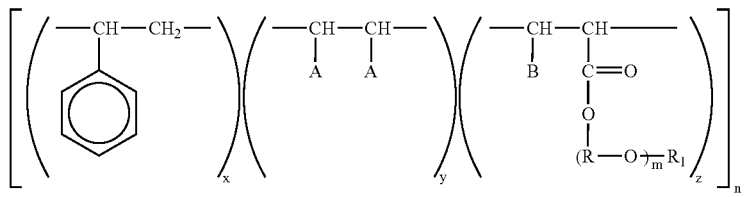

wherein in Formula (II):

A is COOM or optionally in the "y" structure an acid anhydride group (—CO—O—CO—) is formed in place of the A groups between the carbon atoms to which the A groups are bonded to form an anhydride;

B is COOM

M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;

R is a $C_{2-6}$ alkylene radical;

R1 is a $C_{1-20}$ alkyl, $C_{6-9}$ cycloalkyl, or phenyl group;

x, y, and z are a number from 0.01 to 100;

m is a number from 1 to 100; and n is a number from 10 to 100;

c) a dispersant comprising at least one polymer or a salt thereof having the form of a copolymer of
  i) a maleic anhydride half-ester with a compound of the formula RO(AO)$_m$H, wherein R is a $C_1$-$C_{20}$ alkyl group, A is a $C_{2-4}$ alkylene group, and m is an integer from 2-16; and
  ii) a monomer having the formula $CH_2$=$CHCH_2$—$(OA)_n$ OR, wherein n is an integer from 1-90 and R is a $C_{1-20}$ alkyl group;

d) a dispersant obtained by copolymerizing 5 to 98% by weight of an (alkoxy)polyalkylene glycol mono(meth) acrylic ester monomer (a) represented by the following general formula (1):

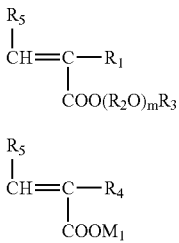

$$\begin{array}{c} R_5 \\ | \\ CH{=}C{-}R_1 \\ | \\ COO(R_2O)_mR_3 \end{array} \quad (1)$$

$$\begin{array}{c} R_5 \\ | \\ CH{=}C{-}R_4 \\ | \\ COOM_1 \end{array} \quad (2)$$

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

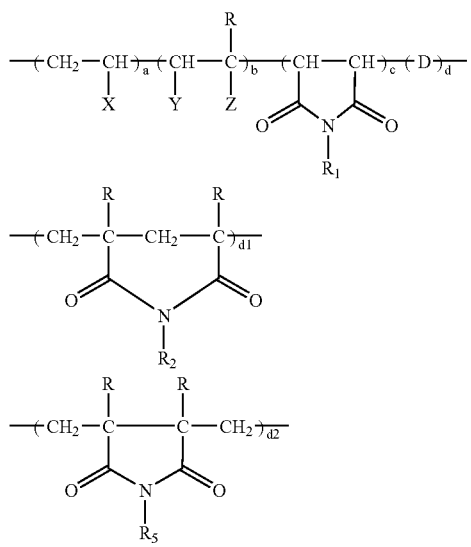

wherein in Formula (III):
D=a component selected from the group consisting of the structure d1, the structure d2, and mixtures thereof;
X=H, $CH_3$, $C_2$ to $C_6$ Alkyl, Phenyl, p-Methyl Phenyl, or Sulfonated Phenyl;
Y=H or —COOM;
R=H or $CH_3$;
Z=H, —$SO_3M$, —$PO_3M$, —COOM, —$O(CH_2)_nOR_3$ where n=2 to 6, —$COOR_3$, or —$(CH_2)_nOR_3$ where n=0 to 6, —$CONHR_3$, —$CONHC(CH_3)_2CH_2SO_3M$, —COO$(CHR_4)_nOH$ where n=2 to 6, or —$O(CH_2)_nOR_4$ wherein n=2 to 6;
$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, or about $C_6$ to about $C_{10}$ aryl;
M=H, Alkali Metal, Alkaline Earth Metal, Ammonium, Amine, triethanol amine, Methyl, or $C_2$ to about $C_6$ Alkyl;
a=0 to about 0.8;
b=about 0.2 to about 1.0;
c=0 to about 0.5;
d=0 to about 0.5; and
wherein a, b, c, and d represent the mole fraction of each unit and the sum of a, b, c, and d is 1.0;

g) a dispersant of Formula (IV):

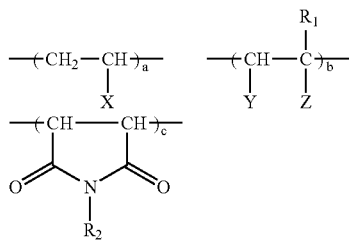

wherein in Formula (IV):
the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;
X=H, $CH_3$, $C_2$ to $C_6$ Alkyl, Phenyl, p-Methyl Phenyl, p-Ethyl Phenyl, Carboxylated Phenyl, or Sulfonated Phenyl;
Y=H, —COOM, —COOH, or W;
W=a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;
Z=H, —COOM, —$O(CH_2)_nOR_3$ where n=2 to 6, —$COOR_3$, —$(CH_2)_nOR_3$ where n=0 to 6, or —$CONHR_3$;
$R_1$=H, or $CH_3$;
$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;
$R_4$=H, Methyl, or $C_2$ to $C_8$ Alkyl;
$R_5$=$C_1$ to $C_{18}$ alkyl or $C_6$ to $C_{18}$ alkyl aryl;

M=Alkali Metal, Alkaline Earth Metal, Ammonia, Amine, monoethanol amine, diethanol amine, triethanol amine, morpholine, imidazole;

a=0.01-0.8;

b=0.2-0.99;

c=0-0.5; and wherein a, b, c represent the mole fraction of each unit and the sum of a, b, and c, is 1;

h) a random copolymer corresponding to the following Formula (V) in free acid or salt form having the following monomer units and numbers of monomer units:

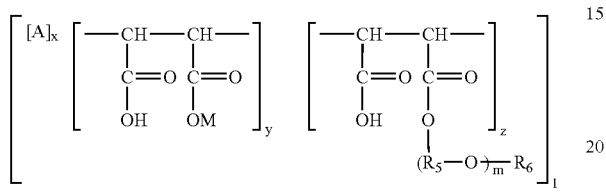

wherein A is selected from the moieties (i) or (ii)

(i) —CR$_1$R$_2$—CR$_3$R$_4$— (ii)

wherein R$_1$ and R$_3$ are selected from substituted benzene, C$_{1-8}$ alkyl, C$_{2-8}$ alkenyl, C$_{2-8}$ alkylcarbonyl, C$_{1-8}$ alkoxy, carboxyl, hydrogen, and a ring, R$_2$ and R$_4$ are selected from the group consisting of hydrogen and C$_{1-4}$ alkyl, wherein R$_1$ and R$_3$ can together with R$_2$ and/or R$_4$ when R$_2$ and/or R$_4$ are C$_{1-4}$ alkyl form the ring;

R$_7$, R$_8$, R$_9$, and R$_{10}$ are individually selected from the group consisting of hydrogen, C$_{1-6}$ alkyl, and a C$_{2-8}$ hydrocarbon chain, wherein R$_1$ and R$_3$ together with R$_7$ and/or R$_8$, R$_9$, and R$_{10}$ form the C$_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —(R$_5$O)$_m$R$_6$;

R$_5$ is a C$_{2-8}$ alkylene radical;

R$_6$ is selected from the group consisting of C$_{1-20}$ alkyl, C$_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:

i) 0 to 90 mol % of at least one component of the formula 3a or 3b:

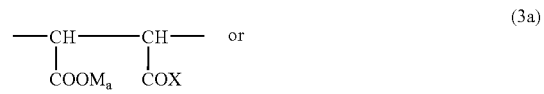

wherein M is a hydrogen atom, a mono- or divalent metal cation, an ammonium ion or an organic amine residue, a is 1, or when M is a divalent metal cation a is ½;

wherein X is —OM$_a$,

—O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100, —NHR$_2$, —N(R$^2$)$_2$ or mixtures thereof in which R$^2$=R$^1$ or —CO—NH$_2$; and wherein Y is an oxygen atom or —NR$^2$;

ii) 1 to 89 mol % of components of the general formula 4:

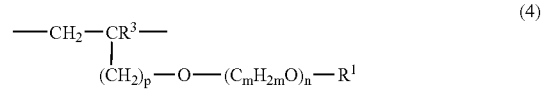

wherein R$_3$ is a hydrogen atom or an aliphatic hydrocarbon radical containing from 1 to 5 carbon atoms, p is 0 to 3, and R$_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

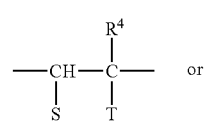

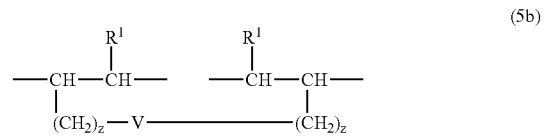

wherein S is a hydrogen atom or —COOM$_a$ or —COOR$_5$, T is —COOR$_5$, —W—R$_7$, —CO—[—NH—(CH2)3)-]$_s$—W—R$_7$, —CO—O—(CH$_2$)$_z$—W—R$_7$, a radical of the general formula:

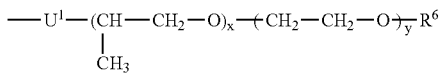

or —(CH$_2$)$_z$—V—(CH$_2$)$_z$—CH=CH—R$_1$, or when S is —COOR$_5$ or —COOM$_a$, U$_1$ is —CO—NHM-, —O— or —CH$_2$O, U$_2$ is —NH—CO—, —O— or —OCH$_2$, V is —O—CO—C$_6$H$_4$—CO—O— or —W—, and W is

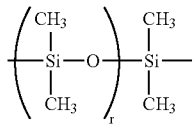

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, R$_6$=R$_1$ or

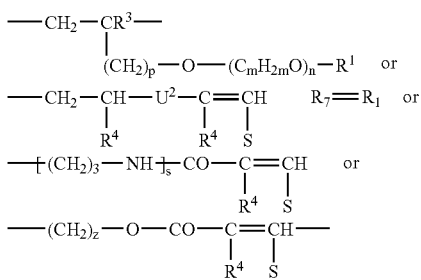

r is 2 to 100, s is 1 or 2, x is 1 to 150, y is 0 to 15 and z is 0 to 4;

iv) 0 to 90 mol % of at least one component of the formula 6a, 6b, or 6c:

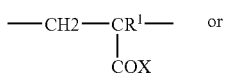 (6a)

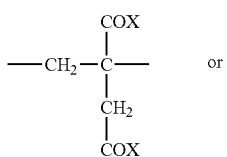 (6b)

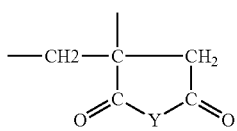 (6c)

wherein M is a hydrogen atom, a mono- or divalent metal cation, an ammonium ion or an organic amine residue, a is 1, or when M is a divalent metal cation a is ½;

wherein X is —OM$_a$,

—O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100, —NH—(C$_m$H$_{2m}$O)$_n$—R$^1$, —NHR$_2$,—N(R$^2$)$_2$ or mixtures thereof in which R$^2$=R$^1$ or —CO—NH$_2$; and wherein Y is an oxygen atom or —NR$^2$;

j) a copolymer of dicarboxylic acid derivatives and oxyalkylene glycol-alkenyl ethers, comprising:

i) 1 to 90 mol. % of at least one member selected from the group consisting of structural units of formula 7a and formula 7b:

wherein M is H, a monovalent metal cation, a divalent metal cation, an ammonium ion or an organic amine;

a is ½ when M is a divalent metal cation or 1 when M is a monovalent metal cation;

wherein R$^1$ is —OM$_a$, or

—O—(C$_m$H$_{2m}$O)$_n$—R$^2$ wherein R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;

m is 2 to 4;

n is 1 to 200;

ii) 0.5 to 80 mol. % of the structural units of formula 8:

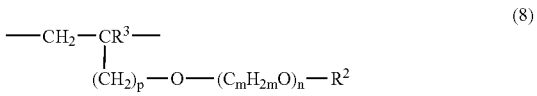

wherein R$^3$ is H or a C$_{1-5}$ aliphatic hydrocarbon;

p is 0 to 3;

R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;

m is 2 to 4;

n is 1 to 200;

iii) 0.5 to 80 mol. % structural units selected from the group consisting of formula 9a and formula 9b:

-continued

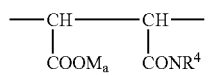
(9b)

wherein $R^4$ is H, $C_{1-20}$ aliphatic hydrocarbon that is optionally substituted with at least one hydroxyl group, $-(C_mH_{2m}O)_n-R^2$, $-CO-NH-R^2$, $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;

M is H, a monovalent metal cation, a divalent metal cation, an ammonium ion or an organic amine;

a is ½ when M is a divalent metal cation or 1 when M is a monovalent metal cation;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;

m is 2 to 4;

n is 1 to 200;

iv) 1 to 90 mol. % of structural units of formula 10

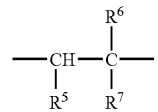
(10)

wherein $R^5$ is methyl, or methylene group, wherein $R^5$ forms one or more 5 to 8 membered rings with $R^7$;

$R^6$ is H, methyl, or ethyl;

$R^7$ is H, a $C_{1-20}$ aliphatic hydrocarbon, a $C_{6-14}$ aryl that is optionally substituted with at least one member selected from the group consisting of $-COOM_a$, $-(SO_3)M_a$, and $-(PO_3)M_{a2}$, a $C_{5-8}$ cycloaliphatic hydrocarbon, $-OCOR^4$, $-OR^4$, and $-COOR^4$, wherein $R^4$ is H, a $C_{1-20}$ aliphatic hydrocarbon that is optionally substituted with at least one $-OH$, $-(C_mH_{2m}O)_n-R^2$, $-CO-NH-R^2$, $C_{5-8}$ cycloaliphatic hydrocarbon, or a $C_{6-14}$ aryl residue that is optionally substituted with a member selected from the group consisting of $-COOM_a$, $-(SO_3)M_a$, and $-(PO_3)M_{a2}$.

In formula (e) the word "derived" does not refer to derivatives in general, but rather to any polycarboxylic acid/salt side chain derivatives of oligoalkyleneglycols, polyalcohols and polyalkylene glycols that are compatible with dispersant properties and do not destroy the graft polymer.

The preferred substituents in the optionally substituted aryl radical of formula (i), containing 6 to 14 carbon atoms, are hydroxyl, carboxyl, $C_{1-14}$ alkyl, or sulfonate groups.

The preferred substituents in the substituted benzene are hydroxyl, carboxyl, $C_{1-14}$ alkyl, or sulfonate groups.

Coloring admixtures in the form of slurries or dispersions are used for four main reasons: (a) to enhance the wetting and dispersion characteristics of materials containing very fine particles with inherently poor wettability; (b) enable dispersion through commonly used equipment; (c) for easier addition to concrete transportation vehicles due to pigment slurry providing uniformly colored concrete mixtures; and (d) to reduce health hazards that may result by handling fine powders. These coloring admixtures are usually composed of pigments, either organic such as phthalocyanine or inorganic pigments such as metal-containing pigments that comprise, but are not limited to metal oxides and others, and can include, but are not limited to, iron oxide containing pigments such as CHROMIX®L (MasterBuilders, Cleveland Ohio), chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, ultramarine blue and cobalt blue.

The color of a pigment can be described in terms of three properties: hue, value, and chroma, which are indicative of the purity (oxide content) and the brightness of the pigment. Hue is the property of a color which distinguishes red from yellow, blue, etc. Value or lightness denotes the light reflecting quality or lightness of a color. Chroma or saturation is the richness or depth of hue or a color and is a measure of its departure from a gray or neutral of equal value.

In one embodiment the liquid coloring suspension contains about 50% to about 75% pigment solids based on the total weight of the liquid coloring suspension. In another embodiment the liquid coloring suspension composition contains about 53% %to about 70% pigment solids based on the total weight of the liquid coloring suspension. In another embodiment a cementitious composition contains about 0.1% to about 10% pigment solids by dry weight of cementitious binder. In a further embodiment a cementitious composition contains about 0.25% to about 6% pigment solids by dry weight of cementitious binder.

The pigment dispersions (liquid coloring suspensions) of the prior art do not effectively disperse the pigment particles in cement and concrete mixtures, particularly when the concentration of pigment in the liquid coloring suspension is high (admixture composition with greater than 55% pigment solids). Additionally, as the concentration of pigment in the liquid coloring suspension increases, the pigment particles begin to separate and settle out of solution providing a poor storage life for the admixture. There are metal containing (iron oxide) pigment dispersions in the prior art with higher than 50% pigment solids, but these dispersions have been formulated for paints or plastics and have negative effects in cement and concrete such as increasing entrapped air. In cementitious mixtures, elevated air decreases design yield and compressive strength, and causes other deleterious effects.

The liquid coloring suspension which contains a polycarboxylate dispersant, improves the dispersion of pigment particles in cementitious compositions when compared to the coloring admixtures in the prior art. Addition of pigment dispersions to cementitious compositions conventionally increases the water demand and decreases the slump, which is one measure of the consistency of concrete. This increase in water demand becomes greater at higher doses of liquid coloring suspension, especially as the concentration of pigment particles in the pigment dispersion increases. In contrast, the liquid coloring suspension of the present invention does not increase the water demand of the cementitious composition even when dosed at high concentrations by weight of cement. Further, the pigment dispersion improves the color of cementitious compositions.

Metal containing (iron oxide) pigment dispersions in the prior art with higher than 50% pigment solids tend to gain viscosity over time which leads to gel formation and decreased shelf life. In addition, some pigment dispersions (liquid coloring suspensions) of the prior art effectively disperse the pigment particles in cement and concrete mixtures but often cause negative effects such as increasing entrapped air. In cementitious mixtures, elevated air decreases compressive strength, makes finishing more difficult, and causes other deleterious effects.

Thixotropic additives decrease pigment separation and settling in liquid coloring suspensions and induce them to thicken up rapidly to form gel structures, i.e., increase its viscosity. The gel structures are self supporting and lower the hydrostatic pressure to the formation as gel strength increases. Thixotropic additives can be organic and synthetic polymers, cellulose or cellulose blended with dispersants, organic flocculents, organic emulsions of paraffin, coal tar, asphalt, acrylics, bentonite and pyrogenic silicas, natural pozzolans, fly ash, hydrated lime, and organoclays such as hectorite clay or smectite clay.

In one embodiment the liquid coloring suspension contains about 0.05% to about 1% thixotropic additive based on the total weight of the liquid coloring suspension. In another embodiment the liquid coloring suspension contains about 0.1% to about 0.70% thixotropic additive based on the total weight of the liquid coloring suspension. In another embodiment a cementitious composition contains about 0.00008% to about 0.17% thixotropic additive by total dry weight of cementitious binder. In a further embodiment a cementitious composition contains about 0.0004% to about 0.07% thixotropic additive by total dry weight of cementitious binder.

While not being limited to theory it is thought that there is a negative synergistic effect caused by the interaction of the polycarboxylate dispersant with the thixotropic additive, as it would be expected based on the prior art that the thixotropic additive would increase the viscosity of the liquid coloring suspension when compared to a liquid coloring suspension containing polycarboxylate dispersant and pigment alone. However, the liquid coloring suspension containing the thixotropic additive has the unexpected result of having a lower viscosity than that of the admixture containing polycarboxylate dispersant and pigment alone, coupled with long term stability (low viscosity). Additionally, as compared to the pigment dispersions of the prior art where the viscosity increases over time causing gelling, the viscosity of the liquid coloring suspension decreases then stabilizes over time. Based on the prior art, it is expected that a liquid coloring suspension, used to impart color to a cementitious composition, containing a dispersant and thixotrope additive would increase in viscosity over time causing the liquid coloring suspension to gel. In the present instance, there is an unexpected synergistic effect due to the interaction of the polycarboxylate dispersant with the thixotropic additive that causes the viscosity of the liquid coloring suspension to decrease, then stabilize over time. This results in increased shelf life stability of the liquid coloring suspension.

The hydraulic cement comprising the cementitious composition is selected from the group consisting of portland cement, modified portland cement, or masonry cement, and mixtures thereof. By portland cement is meant all cementitious compositions which have a high content of tricalcium silicate and includes portland cement and cements that are chemically similar or analogous to portland cement, the specification for which is set forth in ASTM specification C 150-00.

Cementitious materials are materials that alone have hydraulic cementing properties, and set and harden in the presence of water. Included in cementitious materials are ground granulated blast-furnace slag, natural cement, hydraulic hydrated lime, and combinations of these and other materials.

The cementitious composition described herein may contain other additives or ingredients and should not be limited to the stated formulations. Cement additives that can be added include, but are not limited to: set accelerators, set retarders, air-entraining or air detraining agents, water reducers, corrosion inhibitors, wetting agents, water soluble polymers, strength enhancing agents, rheology modifying agents, water repellents, fibers, dampproofing admixtures, gas formers, permeability reducers, pumping aids, fungicidal admixtures, germicidal admixtures, insecticidal admixtures, finely divided mineral admixtures, alkali-reactivity reducer, bonding admixtures, shrinkage reducing admixtures, aggregate, pozzolan and any other admixture or additive that does not adversely affect the properties of the liquid coloring suspension or cementitious composition.

An accelerator that can be used in the liquid coloring suspension can include, but is not limited to, a nitrate salt of an alkali metal, alkaline earth metal, or aluminum; a nitrite salt of an alkali metal, alkaline earth metal, or aluminum; a thiocyanate of an alkali metal, alkaline earth metal or aluminum; an alkanolamine; a thiosulphate of an alkali metal, alkaline earth metal, or aluminum; a hydroxide of an alkali metal, alkaline earth metal, or aluminum; a carboxylic acid salt of an alkali metal, alkaline earth metal, or aluminum (preferably calcium formate); a polyhydroxylalkylamine; a halide salt of an alkali metal or alkaline earth metal (preferably bromide), Examples of accelerators that can be used include, but are not limited to, POZZOLITH® NC534, nonchloride type accelerator and/or RHEOCRETE® CNI calcium nitrite-based corrosion inhibitor both sold under the trademarks by Master Builders Inc. of Cleveland, Ohio.

The salts of nitric acid have the general formula $M(NO_3)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

Nitrite salts have the general formula $M(NO_2)_a$ where M is an alkali metal, or an alkaline earth metal or aluminum, and where a is 1 for alkali metal salts, 2 for alkaline earth salts, and 3 for aluminum salts. Preferred are nitric acid salts of Na, K, Mg, Ca and Al.

The salts of the thiocyanic acid have the general formula $M(SCN)_b$, where M is an alkali metal, or an alkaline earth metal or aluminum, and where b is 1 for alkali metal salts, 2 for alkaline earth salts and 3 for aluminum salts. These salts are variously known as sulfocyanates, sulfocyanides, rhodanates or rhodanide salts. Preferred are thiocyanic acid salts of Na, K, Mg, Ca and Al.

Alkanolamine is a generic term for a group of compounds in which trivalent nitrogen is attached directly to a carbon atom of an alkyl alcohol. A representative formula is $N[H]_c[(CH_2)_dCH_2OH]_e$, where c is 3-e, d is 1 to about 5 and e is 1 to about 3. Examples include, but are not limited to, are monoethanoalamine, diethanolamine and triethanolamine.

The thiosulfate salts have the general formula $M_f(S_2O_3)_g$ where M is alkali metal or an alkaline earth metal or aluminum, and f is 1 or 2 and g is 1, 2 or 3, depending on the valencies of the M metal elements. Preferred are thiosulfate acid salts of Na, K, Mg, Ca and Al.

The carboxylic acid salts have the general formula RCOOM wherein R is H or $C_1$ to about $C_{10}$ alkyl, and M is alkali metal or an alkaline earth metal or aluminum. Preferred are carboxylic acid salts of Na, K, Mg, Ca and Al. A preferred carboxylic acid salt is calcium formate.

A preferred polyhydroxylalkylamine has the general formula

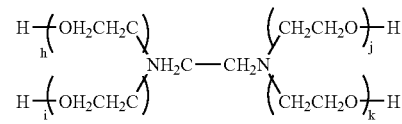

wherein h is 1 to 3, i is 1 to 3, j is 1 to 3, and k is 0 to 3. A preferred polyhydroxyalkylamine is tetrahydroxyethylethylenediamine.

Set retarding, or also known as delayed-setting or hydration control, admixtures are used to retard, delay, or slow the rate of setting of concrete. They can be added to the concrete mix upon initial batching or sometime after the hydration process has begun. Set retarders are used to offset the accelerating effect of hot weather on the setting of concrete, or delay the initial set of concrete or grout when difficult conditions of placement occur, or problems of delivery to the job site, or to allow time for special finishing processes. Most set retarders also act as low level water reducers and can also be used to entrain some air into concrete. Lignosulfonates, hydroxylated carboxylic acids, borax, gluconic, tartaric and other organic acids and their corresponding salts, phosphonates, certain carbohydrates such as sugars and sugar-acids and mixtures thereof can be used as retarding admixtures.

The term air entrainer includes any chemical that will entrain air in cementitious compositions. Air entrainers can also reduce the surface tension of a composition at low concentration. Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from wood resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Generally, the amount of air entrainers (about 5% to about 15% solids content) in a cementitious composition ranges from about 0.07 mL to about 3.9 mL per kilogram of dry cement. In one embodiment the dosage is about 0.33 mL to about 0.98 mL per kilogram of dry cement. Weight percentages of the primary active ingredient of the air entrainers, wherein the primary active ingredient in the air entrainer provides the desired effect i.e., entrainment of air in the cementitious composition, are about 0.001% to about 0.05%; based on the weight of dry cementitious material. But this can vary widely due to variations in materials, mix proportion, temperature, and mixing action. An air entrainer useful with the present admixture composition can be any known air entrainer for cement, including natural resin, synthetic resin, and mixtures thereof. Examples of air entrainers that can be used comprise, but are not limited to MB AE 90, MB VR and MICRO AIR®, all available from Master Builders Inc. of Cleveland, Ohio.

Air detrainers are used to decrease the air content in the cementitious composition. Examples of air detrainers that can be used comprise, but are not limited to tributyl phosphate, dibutyl phthalate, octyl alcohol, water-insoluble esters of carbonic and boric acid, acetylenic diols, ethylene oxide-propylene oxide block copolymers and silicones.

Corrosion inhibitors in concrete serve to protect embedded reinforcing steel from corrosion. The high alkaline nature of the concrete causes a passive and non-corroding protective oxide film to form on the steel. However, carbonation or the presence of chloride ions from deicers or seawater, together with oxygen can destroy or penetrate the film and result in corrosion. Corrosion-inhibiting admixtures chemically slow this corrosion reaction. The materials most commonly used to inhibit corrosion are calcium nitrite, sodium nitrite, sodium benzoate, certain phosphates or fluorosilicates, fluoroaluminates, amines, organic based water repelling agents, and related chemicals.

Dampproofing admixtures reduce the permeability of concrete that has low cement contents, high water-cement ratios, or a deficiency of fines in the aggregate portion. These admixtures retard moisture penetration into dry concrete and include certain soaps, stearates, and petroleum products.

Permeability reducers are used to reduce the rate at which water under pressure is transmitted through concrete. Silica fume, fly ash, ground slag, metakaolin, natural pozzolans, water reducers, and latex can be employed to decrease the permeability of the concrete.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dialdrin emulsions, and copper compounds.

Finely divided mineral admixtures are materials in powder or pulverized form added to concrete before or during the mixing process to improve or change some of the plastic or hardened properties of portland cement concrete. The finely divided mineral admixtures can be classified according to their chemical or physical properties as: cementitious materials; pozzolans; pozzolanic and cementitious materials; and nominally inert materials.

A pozzolan is a siliceous or aluminosiliceous material that possesses little or no cementitious value but will, in the presence of water and in finely divided form, chemically react with the calcium hydroxide produced during the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Natural pozzolan is a term of art used to define the pozzolans that occur in nature, such as volcanic tuffs, pumices, trasses, diatomaceous earths, opaline, cherts, and some shales. Nominally inert materials can also include finely divided raw quartz, dolomites, limestones, marble, granite, and others. Fly ash is defined in ASTM C618.

Alkali-reactivity reducers can reduce the alkali-aggregate reaction and limit the disruptive expansion forces that this reaction can produce in hardened concrete. Pozzolans (fly ash, silica fume), blast-furnace slag, salts of lithium and barium are especially effective.

Fresh concrete can sometimes be harsh because of faulty mixture proportions or certain aggregate characteristics such as particle shape and improper grading. Under these conditions, entrained air, which acts like a lubricant, can be used as a workability improving agent. Other workability agents include certain water reducing admixtures, some viscosity modifying admixtures and certain finely divided admixtures.

In the construction field, many methods of protecting concrete from tensile stresses and subsequent cracking have been developed through the years. One modern method involves distributing fibers throughout a fresh concrete mixture. Upon hardening, this concrete is referred to as fiber-reinforced concrete. Fibers can be made of zirconium materials, carbon, steel, fiberglass, or synthetic materials, e.g., polypropylene, nylon, polyethylene, polyester, rayon, high-strength aramid, or mixtures thereof.

The shrinkage reducing agent which can be used comprises but is not limited to $RO(AO)_{1-10}H$, wherein R is a $C_{1-5}$ alkyl or $C_{5-6}$ cycloalkyl radical and A is a $C_{2-3}$ alkylene radical, alkali metal sulfate, alkaline earth metal sulfates, alkaline earth oxides, preferably sodium sulfate and calcium oxide. TETRAGUARD® is an example of a shrinkage reducing agent (available from Master Builders Inc. of Cleveland, Ohio) that can be used.

Aggregate can be included in the cementitious formulation to provide for mortars which include fine aggregate, and concretes which also include coarse aggregate. The fine aggregate are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, limestone, calcite, feldspar, alluvial sands, sands or any other durable aggregate, and mixtures thereof.

In one embodiment, the cementitious formulation may have a water-to-cementitious materials ratio of about 0.38 to about 0.65.

Examples of the previously described compositions were tested for their effect on the color and viscosity of cementitious compositions.

To compare the pigments dispersing properties of the polycarboxylate containing liquid coloring suspension with the liquid coloring suspensions of the prior art several liquid coloring suspension samples were prepared.

TABLE 1

|  | Sample 1 | Sample 2 | Sample 3 |
|---|---|---|---|
| water | 37.48 | 37.87 | 21.96 |
| melamine dispersant | 2.66 | | |
| acrylic dispersant | 0.62 | | |
| PC dispersant | | 2.24 | 2.24 |
| defoamer | 0.06 | 0.06 | 0.06 |
| dry iron oxide pigment | 59.07 | 59.70 | 70.00 |

Sample 1 which contained a melamine and acrylic dispersant was unable to disperse the pigments in the solution when the concentration of pigment solids was about 60%. This is in contrast to the liquid coloring suspension in which a polycarboxylate dispersant dispersed a pigment concentration of 60% (sample 2) and 70% (sample 3) in a liquid coloring suspension.

To test for an improvement in color in cementitious compositions over the prior art, samples of the liquid coloring suspension were added to cementitious compositions and the tint strength was tested and compared to the tint strength of cementitious compositions containing a prior art liquid coloring suspension.

| Mix Design: | | |
|---|---|---|
| cement (type I/II) | 80 | |
| pigment dispersion | 2.4 | dose/cwt 3 |
| pva | 4 | |
| water | 28 | w/c 0.35 |

The pigment dispersion, pva (polyvinyl acetate), and water were added to the cement and stirred. Using a 5 millimeter (#50) draw down rod, a sample of the mixture was drawn down onto a clean Leneta card and allowed to cure at ambient temperature overnight. The following day the tinting strength of the liquid coloring suspension was compared to the tinting strength of the prior art liquid coloring suspension.

TABLE 2

| liquid coloring suspension | prior art liquid coloring suspension | Dispersion Dose (%/cwt) | Tint Strength of liquid coloring suspension (%) |
|---|---|---|---|
| Yellow iron oxide | Yellow iron oxide | 3 | 111 |
| Light Red iron oxide | Yellow iron oxide | 3 | 149 |

The liquid coloring suspension produced increased color (higher tint) in a cementitious composition as compared to the prior liquid coloring suspension (111% and 149% compared to 100%).

To evaluate the performance of the liquid coloring suspension with different polycarboxylate dispersant chemistries, samples were prepared that contained the polycarboxylate dispersants and iron oxide pigment. The samples were tested for the ability of the polycarboxylate dispersants to disperse the pigment in the liquid coloring suspension and to color the concrete mixtures. The concrete mixtures were prepared using 20.9 (lbs/yd3) cement, 68.7 (lbs/yd3) sand, 84.8 (lbs/yd3) stone and 13.9 (lbs/yd3) water. PC (polycarboxylate) dispersants 1, 2 and 5 comprise the dispersant structure of formula (j) above and PC dispersants 3 and 4 comprise the dispersant structure of formula (d) above.

TABLE 3

|  | Sample 4 | Sample 5 | Sample 6 | Sample 7 | Sample 8 |
|---|---|---|---|---|---|
| Water | 24.87 | 24.87 | 24.87 | 24.87 | 24.87 |
| PC dispersant 1 | 2.24 | | | | |
| PC dispersant 2 | | 2.24 | | | |
| PC dispersant 3 | | | 2.24 | | |
| PC dispersant 4 | | | | 2.24 | |
| PC dispersant 5 | | | | | 2.24 |
| Defoamer | 0.04 | 0.04 | 0.04 | 0.04 | 0.04 |
| Dry yellow iron oxide pigment | 59.70 | 59.70 | 59.70 | 59.70 | 59.70 |
| Dispersant efficiency[1] | high | moderately high | very high | moderate | moderate |
| Dispersion viscosity | 1880 | 2060 | 2240 | 2310 | 2300 |
| Dispersion effect on concrete appearance[2] | 2 | 5 | 1 | 3 | 4 |

[1] qualitative determination of ease of incorporating the pigment into the dispersion
[2] visual determination of appearance; ranking 1-5 with 1 being the most uniform and least amount of efflorescence Table 3 demonstrates that all of the polycarboxylate dispersants dispersed the iron oxide pigment particles in the liquid coloring suspensions without creating a solution with high viscosity. A visual determination of appearance of the concrete mixtures showed that mixtures displayed little efflorescence.

Figure 2:
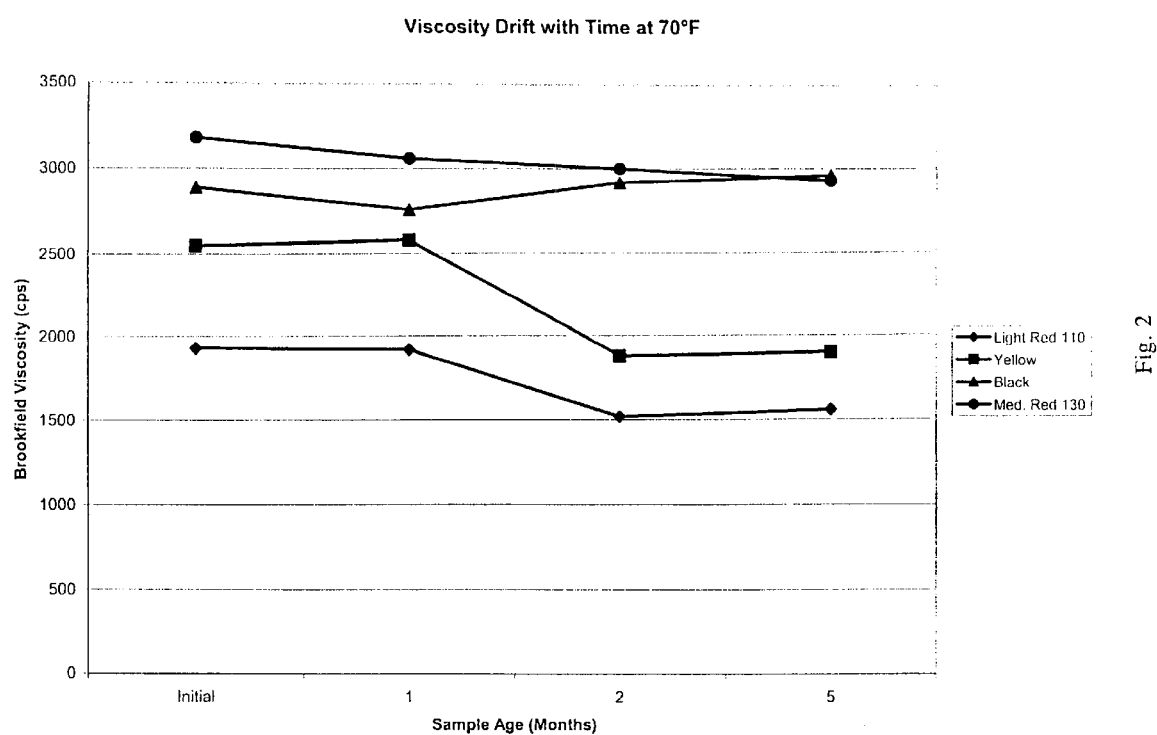
FIG. 2 demonstrates the long term stability of the liquid coloring suspension at 70° F., in that there was no increase in the viscosity of the suspension over time (5 months).
Figure 3:
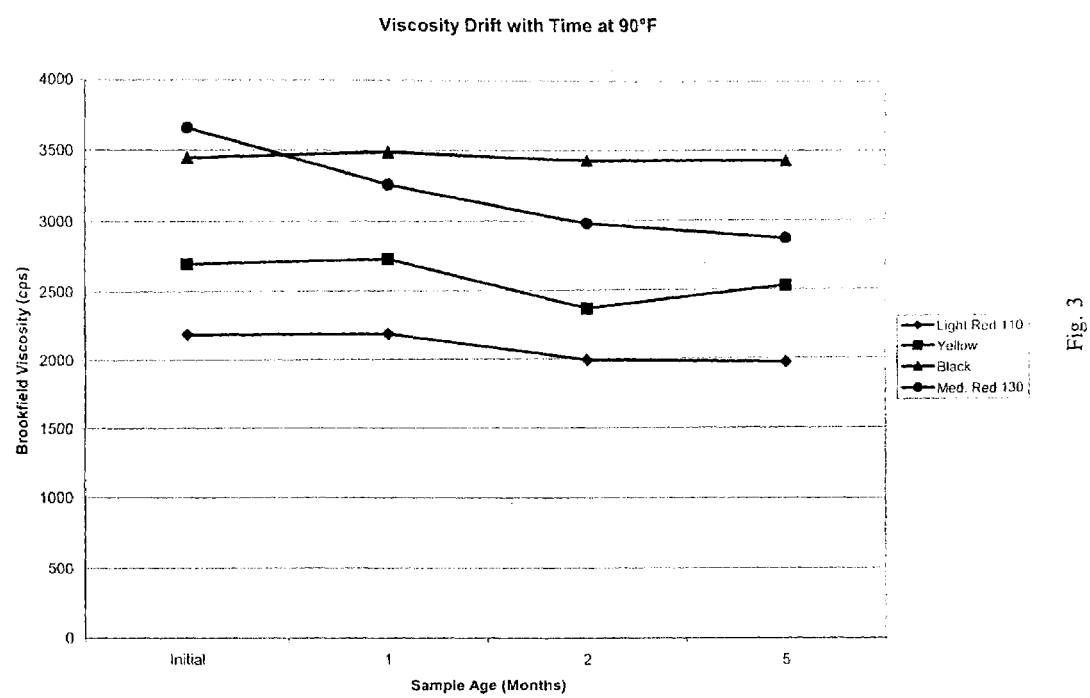
FIG. 3 demonstrates the long term stability of the liquid coloring suspension at 90° F., in that there was no increase in the viscosity of the suspension over time (5 months).

The liquid coloring suspension was tested at varying temperatures (50°, 70°, and 90° Fahrenheit) with different iron oxide pigments to determine if there was a change in liquid coloring suspension viscosity over time. Table 4 shows the sample formulations for the liquid coloring suspensions that were tested. The results of the testing are displayed in FIGS. 1 to 3. The graphs in FIGS. 1 to 3 show that even at varying temperatures the viscosity of the liquid coloring suspension does not increase over time, but rather initially decreases and then stabilizes over time.

TABLE 4

| Samples | Light red 110 | Medium red 130 | Black | Yellow |
|---|---|---|---|---|
| Water | 37.48 | 37.36 | 32.81 | 37.86 |
| Caustic soda, 50% (w/w) | 0.40 | 0.22 | 0.02 | 0.26 |
| Clay thickener | 0.11 | 0.29 | 0.40 | 0.24 |
| Cellulose thickener | 0.11 | 0.29 | | |
| PC dispersant 1 | 3.68 | 3.57 | 3.53 | 3.67 |
| Iron Oxide Red 110 | 57.97 | | | |
| Iron Oxide Red 130 | | 58.00 | | |
| Iron Oxide Black 330 | | | 55.34 | |
| carbon black dispersion | | | 7.60 | |
| Iron Oxide Yellow 313 | | | | 57.70 |
| Biocide | 0.25 | 0.27 | 0.30 | 0.27 |

It will be understood that the embodiment(s) described herein is/are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A method of making a colored cementitious composition without increasing water demand comprising forming a mixture of hydraulic cement and a liquid coloring suspension, said suspension comprising;
   a. liquid;
   b. polycarboxylate dispersant; and
   c. pigment.

2. The method of claim 1 wherein the liquid comprises water.

3. The method of claim 1 wherein the pigment comprises an inorganic pigment.

4. The method of claim 3 wherein the inorganic pigment comprises a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue or mixtures thereof.

5. The method of claim 1 wherein the pigment comprises an organic pigment.

6. The method of claim 5 wherein the organic pigment comprises phthalocyanine.

7. The method of claim 1, wherein the amount of polycarboxylate dispersant solids are from about 0.5% to about 3% and, the pigment solids are from about 50% to about 75%, based on the total weight of the liquid coloring suspension components.

8. The method of claim 1, wherein the amount of polycarboxylate dispersant solids are from about 1% to about 2.5%, and the pigment solids are from about 53% to about 70%, based on the total weight of the liquid coloring suspension components.

9. The method of claim 1, wherein the amount of polycarboxylate dispersant solids are from about 0.0008% to about 0.51% and the pigment solids are from about 0.1% to about 10%, by total dry weight of cementitious binder.

10. The method of claim 1, wherein the amount of polycarboxylate dispersant solids are from about 0.004% to about 0.25% and the pigment solids are from about 0.25% to about 6%, by total dry weight of cementitious binder.

11. The method of claim 1, wherein the water to cementitious materials ratio is about 0.38 to about 0.65.

12. The method of claim 1, wherein the cement comprises at least one of portland cement, modified portland cement, masonry cement, or mixtures thereof.

13. The method of claim 1 further comprising a cement admixture or additive that comprises at least one of set accelerator, set retarder, air detraining agent, air entraining agent, foaming agent, corrosion inhibitor, shrinkage reducing admixture, water reducer, fiber, pozzolan, clay, strength enhancing agents, rheology modifying agents, water repellents, wetting agents, water soluble polymers, dampproofing admixtures, gas formers, permeability reducers, pumping aids, fungicidal admixtures, germicidal admixtures, insecticidal admixtures, aggregates, alkali-reaction reducers, bonding admixtures, or mixtures thereof.

14. The method of claim 13, wherein the aggregate comprises at least one of silica, quartz, crushed round marble, glass spheres, granite, limestone, calcite, feldspar, alluvial sands, or sand.

15. The method of claim 13, wherein the pozzolan comprises at least one of natural pozzolan, metakaolin, fly ash, silica fume, calcined clay, or blast furnace slag.

16. A cementitious composition made by the method of claim 1, wherein the liquid coloring suspension improves the color in the cementitious composition without increasing the water demand.

17. The cementitious composition of claim 16 wherein the liquid comprises water.

18. The cementitious composition of claim 16 wherein the pigment comprises an inorganic pigment.

19. The cementitious composition of claim 18 wherein the inorganic pigment comprises a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue or mixtures thereof.

20. The cementitious composition of claim 16 wherein the pigment comprises an organic pigment.

21. The cementitious composition of claim 20 wherein the organic pigment comprises phthalocyanine.

22. The cementitious composition of claim 16, wherein the amount of polycarboxylate dispersant solids are from about 0.5% to about 3% and, the pigment solids are from about 50% to about 75%, based on the total weight of the liquid coloring suspension components.

23. The cementitious composition of claim 16, wherein the amount of polycarboxylate dispersant solids are from about 1% to about 2.5% and, the pigment solids are from about 53% to about 70%, based on the total weight of the liquid coloring suspension components.

24. The cementitious composition of claim 16, wherein the amount of polycarboxylate dispersant solids are from about 0.0008% to about 0.51% and the pigment solids are from about 0.1% to about 10%, by total dry weight of cementitious binder.

25. The cementitious composition of claim 16, wherein the amount of polycarboxylate dispersant solids are from about 0.004% to about 0.25% and the pigment solids are from about 0.25% to about 6%, by total dry weight of cementitious binder.

26. The cementitious composition of claim 17, wherein the water to cementitious materials ratio is about 0.38 to about 0.65.

27. The cementitious composition of claim 16, wherein the cement comprises at least one of portland cement, modified portland cement, masonry cement, or mixtures thereof.

28. The cementitious composition of claim 16 further comprising a cement admixture or additive that comprises at least one of set accelerator, set retarder, air detraining agent, air entraining agent, foaming agent, corrosion inhibitor, shrinkage reducing admixture, water reducer, fiber, pozzolan, strength enhancing agents, rheology modifying agents, water repellents, wetting agents, water soluble polymers, damp-proofing admixtures, gas formers, permeability reducers, pumping aids, fungicidal admixtures, germicidal admixtures, insecticidal admixtures, aggregates, alkali-reaction reducers, bonding admixtures, or mixtures thereof.

29. The cementitious composition of claim 28, wherein the aggregate comprises at least one of silica, quartz, crushed round marble, glass spheres, granite, limestone, calcite, feldspar, alluvial sands, or sand.

30. The cementitious composition of claim 28, wherein the pozzolan comprises at least one of natural pozzolan, metakaolin, fly ash, silica fume, calcined clay, or blast furnace slag.

31. The method of claim 1 wherein the polycarboxylate dispersant of the liquid coloring suspension is at least one of:

a) a dispersant of Formula (I):

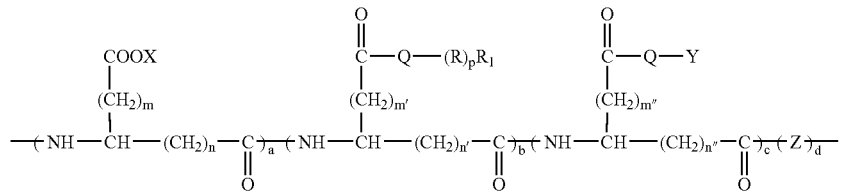

b) a dispersant of Formula (II):

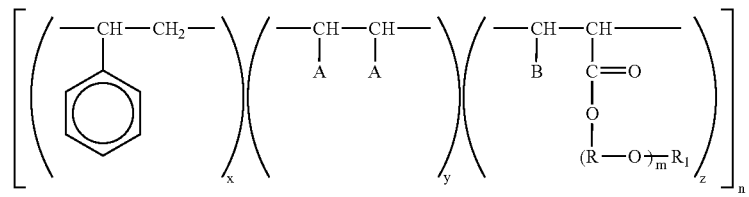

wherein in Formula (I):

X is at least one of hydrogen, an alkali earth metal ion, an alkaline earth metal ion, ammonium ion, or amine;

R is at least one of $C_1$ to $C_6$ alkyl(ene) ether or mixtures thereof or $C_1$ to $C_6$ alkyl(ene) imine or mixtures thereof;

Q is at least one of oxygen, NH, or sulfur;

p is a number from 1 to about 300 resulting in at least one of a linear side chain or branched side chain;

$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;

Y is at least one of hydrogen, an alkali earth metal ion, an alkaline earth metal ion, ammonium ion, amine, a hydrophobic hydrocarbon or polyalkylene oxide moiety that functions as a defoamer;

m, m', m", n, n', and n" are each independently 0 or an integer between 1 and about 20;

Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;

wherein in Formula (II):

A is COOM or optionally in the "y" structure an acid anhydride group (—CO—O—CO—) is formed in place of the A groups between the carbon atoms to which the A groups are bonded to form an anhydride;

B is COOM

M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;

R is a $C_{2-6}$ alkylene radical;

R1 is a $C_{1-20}$ alkyl, $C_{6-9}$ cycloalkyl, or phenyl group;

x, y, and z are a number from 0.01 to 100;

m is a number from 1 to 100; and n is a number from 10 to 100;

c) a dispersant comprising at least one polymer or a salt thereof having the form of a copolymer of
   i) a maleic anhydride half-ester with a compound of the formula RO(AO)$_m$H, wherein R is a $C_1$-$C_{20}$ alkyl group, A is a $C_{2-4}$ alkylene group, and m is an integer from 2-16; and
   ii) a monomer having the formula $CH_2$=$CHCH_2$—$(OA)_n$OR, wherein n is an integer from 1-90 and R is a $C_{1-20}$ alkyl group;

d) a dispersant obtained by copolymerizing 5 to 98% by weight of an (alkoxy)polyalkylene glycol mono(meth)acrylic ester monomer (a) represented by the following general formula (1):

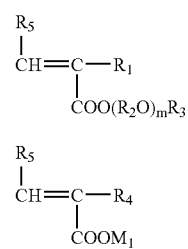

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

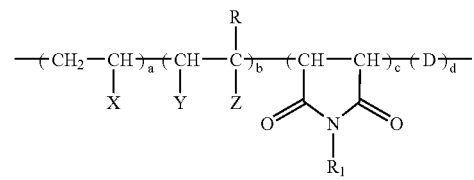

-continued

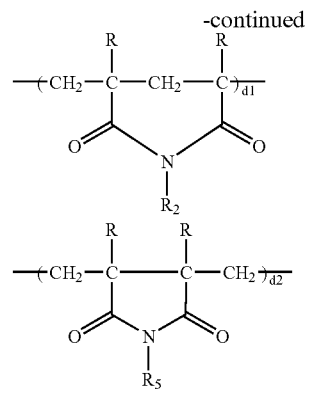

wherein in Formula (III):

D=a component selected from the group consisting of the structure d1, the structure d2, and mixtures thereof;

X=H, $CH_3$, $C_2$ to $C_6$ Alkyl, Phenyl, p-Methyl Phenyl, or Sulfonated Phenyl;

Y=H or —COOM;

R=H or $CH_3$;

Z=H, —$SO_3M$, —$PO_3M$, —COOM, —$O(CH_2)_n OR_3$ where n=2 to 6, —$COOR_3$, or —$(CH_2)_n OR_3$ where n=0 to 6, —$CONHR_3$, —$CONHC(CH_3)_2CH_2SO_3M$, —$COO(CHR_4)_n OH$ where n=2 to 6, or —$O(CH_2)_n OR_4$ wherein n=2 to 6;

$R_1$, $R_2$, $R_3$, $R_5$ are each independently —$(CHRCH_2O)_m R_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, or about $C_6$ to about $C_{10}$ aryl;

M=H, Alkali Metal, Alkaline Earth Metal, Ammonium, Amine, triethanol amine, Methyl, or $C_2$ to about $C_6$ Alkyl;

a=0 to about 0.8;

b=about 0.2 to about 1.0;

c=0 to about 0.5;

d=0 to about 0.5; and wherein a, b, c, and d represent the mole fraction of each unit and the sum of a, b, c, and d is 1.0;

g) a dispersant of Formula (IV):

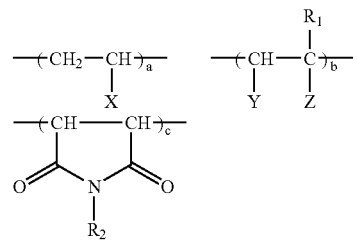

wherein in Formula (IV):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, CH$_3$, C$_2$ to C$_6$ Alkyl, Phenyl, p-Methyl Phenyl, p-Ethyl Phenyl, Carboxylated Phenyl, or Sulfonated Phenyl;

Y=H, —COOM, —COOH, or W;

W=a hydrophobic defoamer represented by the formula R$_5$O—(CH$_2$CH$_2$O)$_s$—(CH$_2$C(CH$_3$)HO)$_t$—(CH$_2$CH$_2$O)$_u$ where s, t, and u are integers from 0 to 200 with the proviso that t>(s+u) and wherein the total amount of hydrophobic defoamer is present in an amount less than about 10% by weight of the polycarboxylate dispersant;

Z=H, —COOM, —O(CH$_2$)$_n$OR$_3$ where n=2 to 6, —COOR$_3$, —(CH$_2$)$_n$OR$_3$ where n=0 to 6, or —CONHR$_3$;

R$_1$=H, or CH$_3$;

R$_2$, R$_3$, are each independently a random copolymer of oxyethylene units and oxypropylene units of the general formula —(CH(R$_1$)CH$_2$O)$_m$R$_4$ where m=10 to 500 and wherein the amount of oxyethylene in the random copolymer is from about 60% to 100% and the amount of oxypropylene in the random copolymer is from 0% to about 40%;

R$_4$=H, Methyl, or C$_2$ to C$_8$ Alkyl;

R$_5$=C$_1$ to C$_{18}$ alkyl or C$_6$ to C$_{18}$ alkyl aryl;

M=Alkali Metal, Alkaline Earth Metal, Ammonia, Amine, monoethanol amine, diethanol amine, triethanol amine, morpholine, imidazole;

a=0.01-0.8;

b=0.2-0.99;

c=0-0.5; and wherein a, b, c represent the mole fraction of each unit and the sum of a, b, and c, is 1;

h) a random copolymer corresponding to the following Formula (V) in free acid or salt form having the following monomer units and numbers of monomer units:

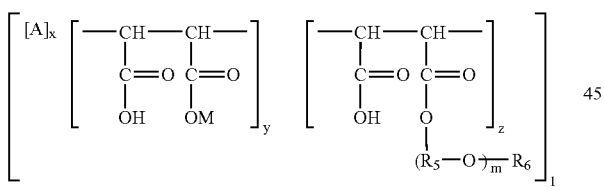

wherein A is selected from the moieties (i) or (ii)

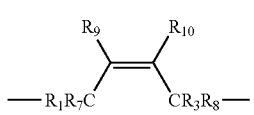

(i) —CR$_1$R$_2$—CR$_3$R$_4$— wherein R$_1$ and R$_3$ are selected from substituted benzene, C$_{1-8}$ alkyl, C$_{2-8}$ alkenyl, C$_{2-8}$ alkylcarbonyl, C$_{1-8}$ alkoxy, carboxyl, hydrogen, and a ring, R$_2$ and R$_4$ are selected from the group consisting of hydrogen and C$_{1-4}$ alkyl, wherein R$_1$ and R$_3$ can together with R$_2$ and/or R$_4$ when R$_2$ and/or R$_4$ are C$_{1-4}$ alkyl form the ring;

R$_7$, R$_8$, R$_9$, and R$_{10}$ are individually selected from the group consisting of hydrogen, C$_{1-6}$ alkyl, and a C$_{2-8}$ hydrocarbon chain, wherein R$_1$ and R$_3$ together with R$_7$ and/or R$_8$, R$_9$, and R$_{10}$ form the C$_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —(R$_5$O)$_m$R$_6$;

R$_5$ is a C$_{2-8}$ alkylene radical;

R$_6$ is selected from the group consisting of C$_{1-20}$ alkyl, C$_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:

i) 0 to 90 mol % of at least one component of the formula 3a or 3b:

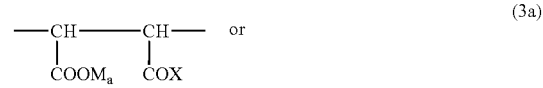

wherein M is a hydrogen atom, a mono- or divalent metal cation, an ammonium ion or an organic amine residue, a is 1, or when M is a divalent metal cation a is ½;

wherein X is —OM$_a$,

—O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100, —NHR$_2$,—N(R$^2$)$_2$ or mixtures thereof in which R$^2$=R$^1$ or —CO—NH$_2$; and wherein Y is an oxygen atom or —NR$^2$;

ii) 1 to 89 mol % of components of the general formula 4:

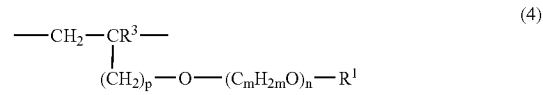

wherein R$_3$ is a hydrogen atom or an aliphatic hydrocarbon radical containing from 1 to 5 carbon atoms, p is 0 to 3, and R$_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

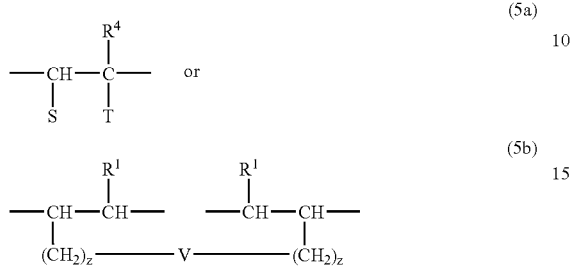

wherein S is a hydrogen atom or —COOM$_a$ or —COOR$_5$, T is —COOR$_5$, —W—R$_7$, —CO—[—NH—(CH2)3)—]$_s$—W—R$_7$, —CO—O—(CH$_2$)$_z$—W—R$_7$, a radical of the general formula:

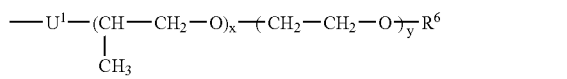

or —(CH$_2$)$_z$—V—(CH$_2$)$_{z-CH=CH-R1}$, or when S is —COOR$_5$ or —COOM$_a$, U$_1$ is —CO—NHM—, —O— or —CH$_2$O, U$_2$ is —NH—CO—, —O— or —OCH$_2$, V is —O—CO—C$_6$H$_4$—CO—O— or —W—, and W is

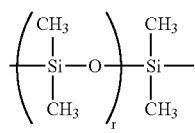

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, R$_6$=R$_1$ or

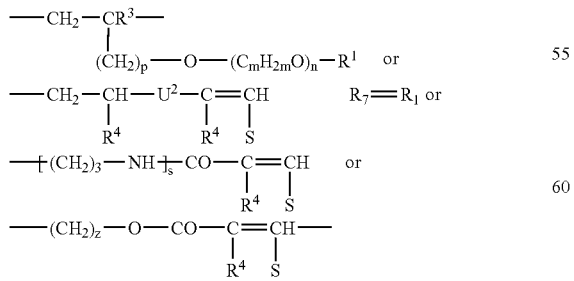

r is 2 to 100, s is 1 or 2, x is 1 to 150, y is 0 to 15 and z is 0 to 4;

iv) 0 to 90 mol % of at least one component of the formula 6a, 6b, or 6c:

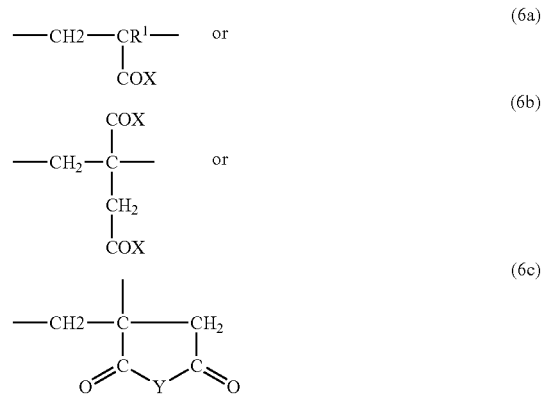

wherein M is a hydrogen atom, a mono- or divalent metal cation, an ammonium ion or an organic amine residue, a is 1, or when M is a divalent metal cation a is ½;

wherein X is —OM$_a$,
—O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100,
—NH—(C$_m$H$_{2m}$O)$_n$—R$^1$,
—NHR$_2$,—N(R$^2$)$_2$ or mixtures thereof in which R$^2$=R$^1$ or
—CO—NH$_2$; and wherein Y is an oxygen atom or —NR$^2$;

j) a copolymer of dicarboxylic acid derivatives and oxyalkylene glycol-alkenyl ethers, comprising:
i) 1 to 90 mol. % of at least one member selected from the group consisting of structural units of formula 7a and formula 7b:

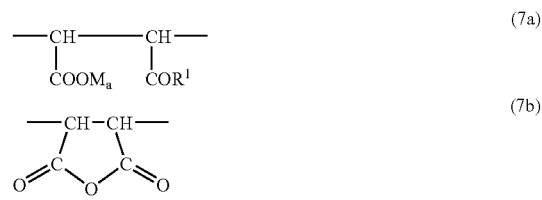

wherein M is H, a monovalent metal cation, a divalent metal cation, an ammonium ion or an organic amine;
a is ½ when M is a divalent metal cation or 1 when M is a monovalent metal cation;
wherein R$^1$ is —OM$_a$, or
—O—(C$_m$H$_{2m}$O)$_n$—R$^2$ wherein R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;
m is 2 to 4;
n is 1 to 200;

ii) 0.5 to 80 mol. % of the structural units of formula 8:

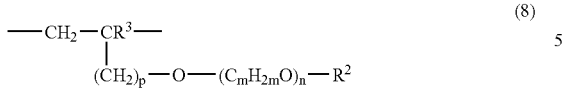
(8)

wherein $R^3$ is H or a $C_{1-5}$ aliphatic hydrocarbon;
p is 0 to 3;
$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —COOM$_a$, —(SO$_3$)M$_a$, and —(PO$_3$)M$_{a2}$;
m is 2 to 4;
n is 1 to 200;
iii) 0.5 to 80 mol. % structural units selected from the group consisting of formula 9a and formula 9b:

(9a)

(9b)

wherein $R^4$ is H, $C_{1-20}$ aliphatic hydrocarbon that is optionally substituted with at least one hydroxyl group, —(C$_m$H$_{2m}$O)$_n$—R$^2$, —CO—NH—R$^2$, $C_{5-8}$ cycloaliphatic hydrocarbon, or a $C_{6-14}$ aryl that is optionally substituted with at least one member selected from the group consisting of —COOM$_a$, —(SO$_3$)M$_a$, and —(PO$_3$)M$_{a2}$;
M is H, a monovalent metal cation, a divalent metal cation, an ammonium ion or an organic amine;
a is ½ when M is a divalent metal cation or 1 when M is a monovalent metal cation;
$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of —COOM$_a$, —(SO$_3$)M$_a$, and —(PO$_3$)M$_{a2}$;
m is 2 to 4;
n is 1 to 200;
iv) 1 to 90 mol. % of structural units of formula 10

(10)

wherein $R^5$ is methyl, or methylene group, wherein $R^5$ forms one or more 5 to 8 membered rings with $R^7$;
$R^6$ is H, methyl, or ethyl;
$R^7$ is H, a $C_{1-20}$ aliphatic hydrocarbon, a $C_{6-14}$ aryl that is optionally substituted with at least one member selected from the group consisting of —COOM$_a$, —(SO$_3$)M$_a$, and —(PO$_3$)M$_{a2}$, a $C_{5-8}$ cycloaliphatic hydrocarbon, —OCOR$^4$, —OR$^4$, and —COOR$^4$, wherein $R^4$ is H, a $C_{1-20}$ aliphatic hydrocarbon that is optionally substituted with at least one —OH, —(C$_m$H$_{2m}$O)$_n$—R$^2$, —CO—NH—R$^2$, $C_{5-8}$ cycloaliphatic hydrocarbon, or a $C_{6-14}$ aryl residue that is optionally substituted with a member selected from the group consisting of —COOM$_a$, —(SO$_3$)M$_a$, and —(PO$_3$)M$_{a2}$.

32. A cementitious composition made by the method of claim 31.

33. The cementitious composition of claim 32 wherein the liquid comprises water.

34. The cementitious composition of claim 32 wherein the pigment comprises an inorganic pigment.

35. The cementitious composition of claim 34 wherein the inorganic pigment comprises a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue or mixtures thereof.

36. The cementitious composition of claim 32 wherein the pigment comprises an organic pigment.

37. The cementitious composition of claim 36 wherein the organic pigment comprises phthalocyanine.

38. The cementitious composition of claim 32, wherein the amount of polycarboxylate dispersant solids are from about 0.5% to about 3% and, the pigment solids are from about 50% to about 75%, based on the total weight of the liquid coloring suspension components.

39. The cementitious composition of claim 32, wherein the amount of polycarboxylate dispersant solids are from about 1% to about 2.5% and, the pigment solids are from about 53% to about 70%, based on the total weight of the liquid coloring suspension components.

40. The cementitious composition of claim 32, wherein the amount of polycarboxylate dispersant solids are from about 0.0008% to about 0.51% and the pigment solids are from about 0.1% to about 10%, by total dry weight of cementitious binder.

41. The cementitious composition of claim 32, wherein the amount of polycarboxylate dispersant solids are from about 0.004% to about 0.25% and the pigment solids are from about 0.25% to about 6%, by total dry weight of cementitious binder.

42. The cementitious composition of claim 33, wherein the water to cementitious materials ratio is about 0.38 to about 0.65.

43. The cementitious composition of claim 32, wherein the cement is at least one of portland cement, modified portland cement, masonry cement, or mixtures thereof.

44. The cementitious composition of claim 32 further comprising a cement admixture or additive that comprises at least one of set accelerator, set retarder, air detraining agent, air entraining agent, foaming agent, corrosion inhibitor, shrinkage reducing admixture, water reducer, fiber, pozzolan, strength enhancing agents, rheology modifying agents, water repellents, wetting agents, water soluble polymers, damp-proofing admixtures, gas formers, permeability reducers, pumping aids, fungicidal admixtures, germicidal admixtures, insecticidal admixtures, aggregates, alkali-reaction reducers, bonding admixtures, or mixtures thereof.

45. The cementitious composition of claim 44, wherein the aggregate comprises at least one of silica, quartz, crushed round marble, glass spheres, granite, limestone, calcite, feldspar, alluvial sands, or sand.

46. The cementitious composition of claim 44, wherein the pozzolan comprises at least one of natural pozzolan, metakaolin, fly ash, silica fume, calcined clay, or blast furnace slag.

47. A liquid coloring suspension comprising:
   a. liquid
   b. polycarboxylate dispersant;
   c. pigment; and
   d. thixotropic additive;
   wherein the viscosity of the liquid coloring suspension is stable over time.

48. The liquid coloring suspension of claim 47, wherein the amount of polycarboxylate dispersant solids are from about 0.5% to about 3%, pigment solids are from about 50% to about 75%, and thixotropic additive is from about 0.05% to about 1%, based on the total weight of the liquid coloring suspension.

49. The liquid coloring suspension of claim 47, wherein the amount of polycarboxylate dispersant solids are from about 1% to about 2.5%, pigment solids are from about 53% to about 70%, and thixotropic additive is from about 0.1% to about 0.7%, based on the total weight of the liquid coloring suspension.

50. The liquid coloring suspension of claim 47 wherein the liquid comprises water.

51. The liquid coloring suspension of claim 47 wherein the pigment comprises an inorganic pigment.

52. The liquid coloring suspension of claim 51 wherein the inorganic pigment comprises a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue or mixtures thereof.

53. The liquid coloring suspension of claim 47 wherein the pigment comprises an organic pigment.

54. The liquid coloring suspension of claim 53 wherein the organic pigment comprises phthalocyanine.

55. The liquid coloring suspension of claim 47 wherein the thixotropic additive comprises at least one of organic flocculents, organic emulsions of paraffin, coal tar, asphalt, acrylics, bentonite, pyrogenic silicas, natural pozzolans, fly ash, hydrated lime, organoclay, cellulose or mixtures thereof.

56. The liquid coloring suspension of claim 55 wherein the organoclay comprises at least one of hectorite clay or smectite clay.

57. The liquid coloring suspension of claim 47 further comprising at least one of set accelerators, set retarders, air detraining agents, air entraining agents, shrinkage reducing admixtures, water reducers, foaming agents, dampproofing admixtures, pumping aids, fungicidal admixtures, insecticidal admixtures, germicidal admixtures, alkali activity reducers, bonding admixtures, or corrosion inhibitors.

58. A colored cementitious composition comprising hydraulic cement and a liquid coloring suspension, said liquid coloring suspension comprising:
   a. liquid;
   b. polycarboxylate dispersant;
   c. pigment; and
   d. thixotropic additive;
   wherein the liquid coloring suspension improves the color in the cementitious composition without increasing the water demand.

59. The colored cementitious composition of claim 58 wherein the liquid comprises water.

60. The colored cementitious composition of claim 58 wherein the pigment comprises an inorganic pigment.

61. The colored cementitious composition of claim 60 wherein the inorganic pigment comprises a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue or mixtures thereof.

62. The colored cementitious composition of claim 58 wherein the pigment comprises an organic pigment.

63. The colored cementitious composition of claim 62 wherein the organic pigment comprises phthalocyanine.

64. The colored cementitious composition of claim 58 wherein the thixotropic additive comprises at least one of organic flocculents, organic emulsions of paraffin, coal tar, asphalt, acrylics, bentonite, pyrogenic silicas, natural pozzolans, fly ash, hydrated lime, organoclay, cellulose or mixtures thereof.

65. The colored cementitious composition of claim 64 wherein the organoclay comprises at least one of hectorite clay or smectite clay.

66. The colored cementitious composition of claim 58, wherein the amount of polycarboxylate dispersant solids are from about 0.0008% to about 0.51%, pigment solids are from about 0.1% to about 10%, and thixotropic additive is from about 0.00008% to about 0.17%, by total dry weight of cementitious binder.

67. The colored cementitious composition of claim 58, wherein the amount of polycarboxylate dispersant solids are from about 0.004% to about 0.25%, pigment solids are from about 0.25% to about 6%, and thixotropic additive is from about 0.0004% to about 0.07%, by total dry weight of cementitious binder.

68. The cementitious composition of claim 59, wherein the water to cementitious composition ratio is about 0.38 to about 0.65.

69. The colored cementitious composition of claim 58, wherein the cement comprises at least one of portland cement, modified portland cement, masonry cement, or mixtures thereof.

70. The colored cementitious composition of claim 58 further comprising a cement admixture or additive that comprises at least one of set accelerator, set retarder, air detraining agent, air entraining agent, foaming agent, corrosion inhibitor, shrinkage reducing admixture, water reducer, fiber, pozzolan, strength enhancing agents, rheology modifying agents, water repellents, wetting agents, water soluble polymers, dampproofing admixtures, gas formers, permeability reducers, pumping aids, fungicidal admixtures, germicidal admixtures, insecticidal admixtures, aggregates, alkali-reaction reducers, bonding admixtures, or mixtures thereof.

71. The colored cementitious composition of claim 70, wherein the aggregate comprises at least one of silica, quartz, crushed round marble, glass spheres, granite, limestone, calcite, feldspar, alluvial sands, or sand.

72. The colored cementitious composition of claim 70, wherein the pozzolan comprises at least one of natural pozzolan, metakaolin, fly ash, silica fume, calcined clay, or blast furnace slag.

73. The colored cementitious composition of claim 58 wherein the polycarboxylate dispersant of the liquid coloring suspension is at least one of:

a) a dispersant of Formula (I):

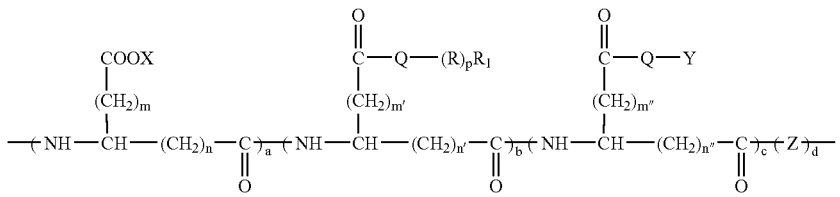

wherein in Formula (I)
  X is at least one of hydrogen, an alkali earth metal ion, an alkaline earth metal ion, ammonium ion, or amine;
  R is at least one of $C_1$ to $C_6$ alkyl(ene) ether or mixtures thereof or $C_1$ to $C_6$ alkyl(ene) imine or mixtures thereof;
  Q is at least one of oxygen, NH, or sulfur;
  p is a number from 1 to about 300 resulting in at least one of a linear side chain or branched side chain;
  $R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
  Y is at least one of hydrogen, an alkali earth metal ion, an alkaline earth metal ion, ammonium ion, amine, a hydrophobic hydrocarbon or polyalkylene oxide moiety that functions as a defoamer;
  m, m', m", n, n', and n" are each independently 0 or an integer between 1 and about 20;
  Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
  wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;
b) a dispersant of Formula (II):

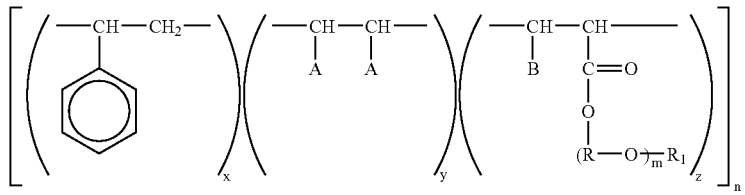

wherein in Formula (II):
  A is COOM or optionally in the "y" structure an acid anhydride group (—CO—O—CO—) is formed in place of the A groups between the carbon atoms to which the A groups are bonded to form an anhydride;
  B is COOM
  M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;

R is a $C_{2-6}$ alkylene radical;
  R1 is a $C_{1-20}$ alkyl, $C_{6-9}$ cycloalkyl, or phenyl group;
  x, y, and z are a number from 0.01 to 100;
  m is a number from 1 to 100; and
  n is a number from 10 to 100;
c) a dispersant comprising at least one polymer or a salt thereof having the form of a copolymer of
  i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and
  ii) a monomer having the formula $CH_2$=$CHCH_2$—$(OA)_nOR$, wherein n is an integer from 1-90 and R is a $C_{1-20}$ alkyl group;
d) a dispersant obtained by copolymerizing 5 to 98% by weight of an (alkoxy)polyalkylene glycol mono(meth) acrylic ester monomer (a) represented by the following general formula (1):

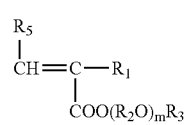

(1)

-continued

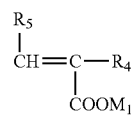

(2)

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;

e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;

f) a dispersant of Formula (III):

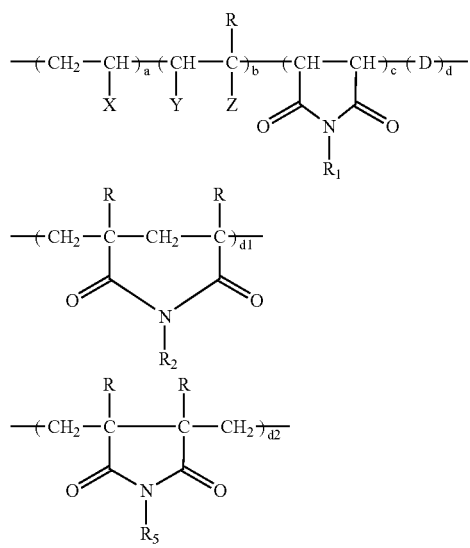

wherein in Formula (III):

D=a component selected from the group consisting of the structure d1, the structure d2, and mixtures thereof;

X=H, $CH_3$, $C_2$ to $C_6$ Alkyl, Phenyl, p-Methyl Phenyl, or Sulfonated Phenyl;

Y=H or —COOM;

R=H or $CH_3$;

Z=H, —$SO_3M$, —$PO_3M$, —COOM, —$O(CH_2)_nOR_3$ where n=2 to 6, —$COOR_3$, or —$(CH_2)_nOR_3$ where n=0 to 6, —$CONHR_3$, —$CONHC(CH_3)_2CH_2SO_3M$, —$COO(CHR_4)_nOH$ where n=2 to 6, or —$(CH_2)_nOR_4$ wherein n=2 to 6;

$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;

$R_4$=H, Methyl, $C_2$ to about $C_6$ Alkyl, or about $C_6$ to about $C_{10}$ aryl;

M=H, Alkali Metal, Alkaline Earth Metal, Ammonium, Amine, triethanol amine, Methyl, or $C_2$ to about $C_6$ Alkyl;

a=0 to about 0.8;
b=about 0.2 to about 1.0;
c=0 to about 0.5;
d=0 to about 0.5; and wherein a, b, c, and d represent the mole fraction of each unit and the sum of a, b, c, and d is 1.0;

g) a dispersant of Formula (IV):

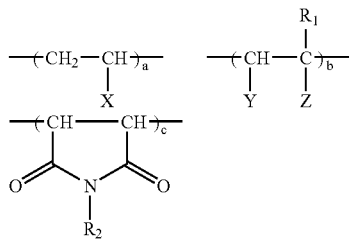

wherein in Formula (IV):

the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;

X=H, $CH_3$, $C_2$ to $C_6$ Alkyl, Phenyl, p-Methyl Phenyl, p-Ethyl Phenyl, Carboxylated Phenyl, or Sulfonated Phenyl;

Y=H, —COOM, —COOH, or W;

W=a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;

Z=H, —COOM, —$(CH_2)_nOR_3$ where n=2 to 6, —$COOR_3$, —$(CH_2)_nOR_3$ where n=0 to 6, or —$CONHR_3$;

$R_1$=H, or $CH_3$;

$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;

$R_4$=H, Methyl, or $C_2$ to $C_8$ Alkyl;

$R_5$=$C_1$ to $C_{18}$ alkyl or $C_6$ to $C_{18}$ alkyl aryl;

M=Alkali Metal, Alkaline Earth Metal, Ammonia, Amine, monoethanol amine, diethanol amine, triethanol amine, morpholine, imidazole;

a=0.01-0.8;
b=0.2-0.99;
c=0-0.5; and wherein a, b, c represent the mole fraction of each unit and the sum of a, b, and c, is 1;

h) a random copolymer corresponding to the following Formula (V) in free acid or salt form having the following monomer units and numbers of monomer units:

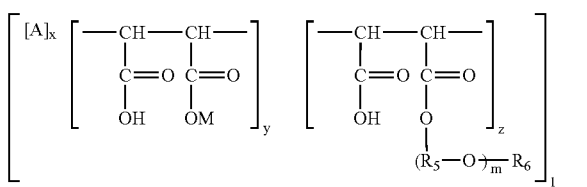

wherein A is selected from the moieties (i) or (ii)

(i) —CR$_1$R$_2$—CR$_3$R$_4$— wherein R$_1$ and R$_3$ are selected from substituted benzene, C$_{1-8}$ alkyl, C$_{2-8}$ alkenyl, C$_{2-8}$ alkylcarbonyl, C$_{1-8}$ alkoxy, carboxyl, hydrogen, and a ring, R$_2$ and R$_4$ are selected from the group consisting of hydrogen and C$_{1-4}$ alkyl, wherein R$_1$ and R$_3$ can together with R$_2$ and/or R$_4$ when R$_2$ and/or R$_4$ are C$_{1-4}$ alkyl form the ring;

R$_7$, R$_8$, R$_9$, and R$_{10}$ are individually selected from the group consisting of hydrogen, C$_{1-6}$ alkyl, and a C$_{2-8}$ hydrocarbon chain, wherein R$_1$ and R$_3$ together with R$_7$ and/or R$_8$, R$_9$, and R$_{10}$ form the C$_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —(R$_5$O)$_m$R$_6$;

R$_5$ is a C$_{2-8}$ alkylene radical;

R$_6$ is selected from the group consisting of C$_{1-20}$ alkyl, C$_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:

i) 0 to 90 mol % of at least one component of the formula 3a or 3b:

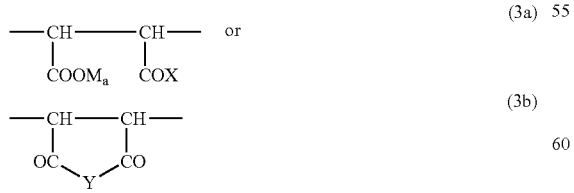

wherein M is a hydrogen atom, a mono- or divalent metal cation, an ammonium ion or an organic amine residue, a is 1, or when M is a divalent metal cation a is ½;

wherein X is —OM$_a$,

—O—(C$_m$H$_{2m}$O)$_n$—R$^1$ in which R$^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulphonic substituted aryl radical containing 6 to 14 carbon atoms, m is 2 to 4, and n is 0 to 100, —NHR$_2$,—N(R$^2$)$_2$ or mixtures thereof in which R$^2$=R$^1$ or —CO—NH$_2$; and wherein Y is an oxygen atom or —NR$^2$;

ii) 1 to 89 mol % of components of the general formula 4:

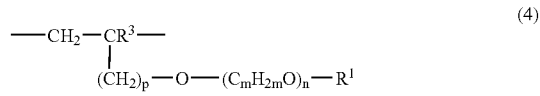

wherein R$_3$ is a hydrogen atom or an aliphatic hydrocarbon radical containing from 1 to 5 carbon atoms, p is 0 to 3, and R$_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, C$_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

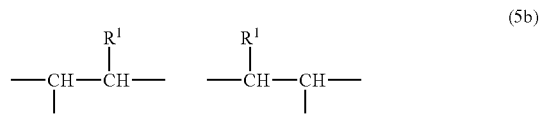

wherein S is a hydrogen atom or —COOM$_a$ or —COOR$_5$, T is —COOR$_5$, —W—R$_7$, —CO—[—NH—(CH2)3)-]$_5$-W—R$_7$, —CO—O—(CH$_2$)$_z$—W—R$_7$, a radical of the general formula:

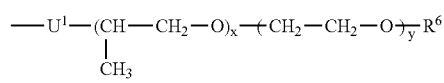

or —(CH$_2$)$_z$—V—(CH$_2$)$_z$—CH=CH—R$_1$, or when S is —COOR$_5$ or —COOM$_a$, U$_1$ is —CO—NHM-, —O— or —CH$_2$O, U$_2$ is —NH—CO—, —O— or —OCH$_2$, V is —O—CO—C$_6$H$_4$—CO—O— or —W—, and W is

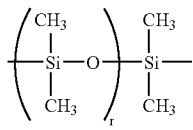

R4 is a hydrogen atom or a methyl radical, R5 is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6 = R_1$ or

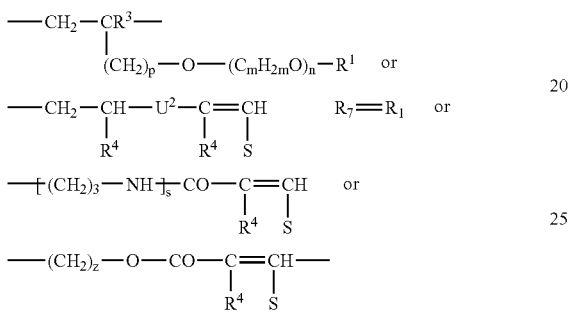

r is 2 to 100, s is 1 or 2, x is 1 to 150, y is 0 to 15 and z is 0 to 4;

iv) 0 to 90 mol % of at least one component of the formula 6a, 6b, or 6c:

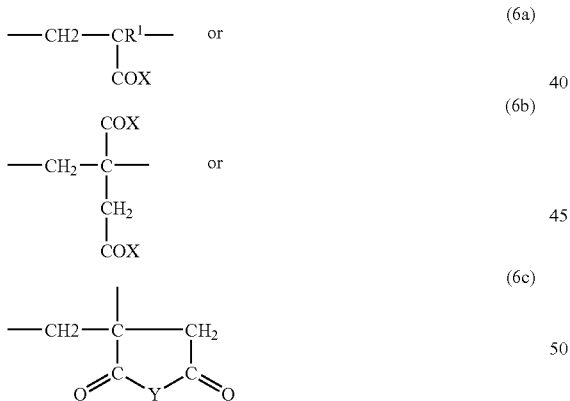

wherein M is a hydrogen atom, a mono- or divalent metal cation, an ammonium ion or an organic amine residue, a is 1, or when M is a divalent metal cation a is ½;

wherein X is $—OM_a$, $—O—(C_mH_{2m}O)_n—R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100, $—NH—(C_mH_{2m}O)_n—R^1$, $—NHR_2, —N(R^2)_2$ or mixtures thereof in which $R^2 = R^1$ or $—CO—NH_2$; and wherein Y is an oxygen atom or $—NR^2$;

j) a copolymer of dicarboxylic acid derivatives and oxyalkylene glycol-alkenyl ethers, comprising:

i) 1 to 90 mol. % of at least one member selected from the group consisting of structural units of formula 7a and formula 7b:

wherein M is H, a monovalent metal cation, a divalent metal cation, an ammonium ion or an organic amine;

a is ½ when M is a divalent metal cation or 1 when M is a monovalent metal cation;

wherein $R^1$ is $—OM_a$, or $—O—(C_mH_{2m}O)_n—R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $—COOM_a$, $—(SO_3)M_a$, and $—(PO_3)M_{a2}$;

m is 2 to 4;

n is 1 to 200;

ii) 0.5 to 80 mol. % of the structural units of formula 8:

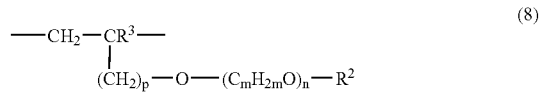

wherein $R^3$ is H or a $C_{1-5}$ aliphatic hydrocarbon;

p is 0 to 3;

$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $—COOM_a$, $—(SO_3)M_a$, and $—(PO_3)M_{a2}$;

m is 2 to 4;

n is 1 to 200;

iii) 0.5 to 80 mol. % structural units selected from the group consisting of formula 9a and formula 9b:

wherein $R^4$ is H, $C_{1-20}$ aliphatic hydrocarbon that is optionally substituted with at least one hydroxyl group, —(C$_m$H$_{2m}$O)$_n$—R$^2$, —CO—NH—R$^2$, C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;

M is H, a monovalent metal cation, a divalent metal cation, an ammonium ion or an organic amine;

a is ½ when M is a divalent metal cation or 1 when M is a monovalent metal cation;

R$^2$ is H, a C$_{1-20}$ aliphatic hydrocarbon, a C$_{5-8}$ cycloaliphatic hydrocarbon, or a C$_{6-14}$ aryl that is optionally substituted with at least one member selected from the group consisting of —COOM$_a$, —(SO$_3$)M$_a$, and —(PO$_3$)M$_{a2}$;

m is 2 to 4;

n is 1 to 200;

iv) 1 to 90 mol. % of structural units of formula 10

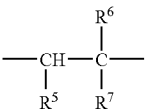
(10)

wherein R$^5$ is methyl, or methylene group, wherein R$^5$ forms one or more 5 to 8 membered rings with R$^7$;

R$^6$ is H, methyl, or ethyl;

R$^7$ is H, a C$_{1-20}$ aliphatic hydrocarbon, a C$_{6-14}$ aryl that is optionally substituted with at least one member selected from the group consisting of —COOM$_a$, —(SO$_3$)M$_a$, and —(PO$_3$)M$_{a2}$, a C$_{5-8}$ cycloaliphatic hydrocarbon, —OCOR$^4$, —OR$^4$, and —COOR$^4$, wherein R$^4$ is H, a C$_{1-20}$ aliphatic hydrocarbon that is optionally substituted with at least one —OH, —(C$_m$H$_{2m}$O)$_n$—R$^2$, —CO—NH—R$^2$, C$_{5-8}$ cycloaliphatic hydrocarbon, or a C$_{6-14}$ aryl residue that is optionally substituted with a member selected from the group consisting of —COOM$_a$, —(SO$_3$)M$_a$, and —(PO$_3$)M$_{a2}$.

74. A method of making a colored cementitious composition without increasing water demand comprising forming a mixture of hydraulic cement and the liquid coloring suspension of claim 73.

75. A method of making a colored cementitious composition without increasing water demand comprising forming a mixture of hydraulic cement and a liquid coloring suspension, said liquid coloring suspension comprising:
  a. liquid;
  b. polycarboxylate dispersant;
  c. pigment; and
  d. thixotropic additive.

76. The method of claim 74 or 75 wherein the liquid comprises water.

77. The method of claim 74 or 75 wherein the pigment comprises an inorganic pigment.

78. The method of claim 77 wherein the inorganic pigment comprises a metal containing pigment that comprises at least one of iron oxide, chromium oxide, aluminum oxide, lead chromate, titanium oxide, zinc white, zinc oxide, zinc sulfide, lead white, iron manganese black, cobalt green, manganese blue, manganese violet, cadmium sulfoselenide, chromium orange, nickel titanium yellow, chromium titanium yellow, cadmium sulfide, zinc yellow, cobalt blue, ultramarine blue or mixtures thereof.

79. The method of claim 74 or 75 wherein the pigment comprises an organic pigment.

80. The method of claim 79 wherein the organic pigment comprises phthalocyanine.

81. The method of claim 74 or 75 wherein the thixotropic additive comprises at least one of organic flocculents, organic emulsions of paraffin, coal tar, asphalt, acrylics, bentonite, pyrogenic silicas, natural pozzolans, fly ash, hydrated lime, organoclay, cellulose or mixtures thereof.

82. The method of claim 81 wherein the organoclay comprises at least one of hectorite clay or smectite clay.

83. The method of claim 74 or 75, wherein the amount of polycarboxylate dispersant solids are from about 0.0008% to about 0.51%, pigment solids are from about 0.1% to about 10%, and thixotropic additive is from about 0.00008% to about 0.17%, by total dry weight of cementitious binder.

84. The method of claim 74 or 75, wherein the amount of polycarboxylate dispersant solids are from about 0.004% to about 0.25%, pigment solids are from about 0.25% to about 6%, and thixotropic additive is from about 0.0004% to about 0.07%, by total dry weight of cementitious binder.

85. The method of claim 76, wherein the water to cementitious materials ratio is about 0.38 to about 0.65.

86. The method of claim 74 or 75, wherein the cement comprises at least one of portland cement, modified portland cement, masonry cement, or mixtures thereof.

87. The method of claim 74 or 75 further comprising a cement admixture or additive that comprises at least one of set accelerator, set retarder, air detraining agent, air entraining agent, foaming agent, corrosion inhibitor, shrinkage reducing admixture, water reducer, fiber, pozzolan, clay, strength enhancing agents, rheology modifying agents, water repellents, wetting agents, water soluble polymers, dampproofing admixtures, gas formers, permeability reducers, pumping aids, fungicidal admixtures, germicidal admixtures, insecticidal admixtures, aggregates, alkali-reaction reducers, bonding admixtures, or mixtures thereof.

88. The method of claim 87, wherein the aggregate comprises at least one of silica, quartz, crushed round marble, glass spheres, granite, limestone, calcite, feldspar, alluvial sands, or sand.

89. The method of claim 87, wherein the pozzolan comprises at least one of natural pozzolan, metakaolin, fly ash, silica fume, calcined clay, or blast furnace slag.

90. The liquid coloring suspension of claim 47 wherein the polycarboxylate dispersant of the liquid coloring suspension is at least one of:
  a) a dispersant of Formula (I):

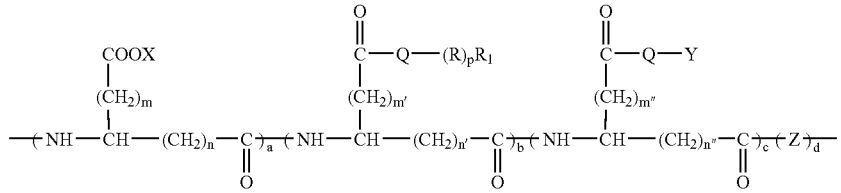

wherein in Formula (I)
X is at least one of hydrogen, an alkali earth metal ion, an alkaline earth metal ion, ammonium ion, or amine;
R is at least one of $C_1$ to $C_6$ alkyl(ene) ether or mixtures thereof or $C_1$ to $C_6$ alkyl(ene) imine or mixtures thereof;
Q is at least one of oxygen, NH, or sulfur;
p is a number from 1 to about 300 resulting in at least one of a linear side chain or branched side chain;
$R_1$ is at least one of hydrogen, $C_1$ to $C_{20}$ hydrocarbon, or functionalized hydrocarbon containing at least one of —OH, —COOH, an ester or amide derivative of —COOH, sulfonic acid, an ester or amide derivative of sulfonic acid, amine, or epoxy;
Y is at least one of hydrogen, an alkali earth metal ion, an alkaline earth metal ion, ammonium ion, amine, a hydrophobic hydrocarbon or polyalkylene oxide moiety that functions as a defoamer;
m, m', m'', n, n', and n'' are each independently 0 or an integer between 1 and about 20;
Z is a moiety containing at least one of i) at least one amine and one acid group, ii) two functional groups capable of incorporating into the backbone selected from the group consisting of dianhydrides, dialdehydes, and di-acid-chlorides, or iii) an imide residue; and
wherein a, b, c, and d reflect the mole fraction of each unit wherein the sum of a, b, c, and d equal one, wherein a, b, c, and d are each a value greater than or equal to zero and less than one, and at least two of a, b, c, and d are greater than zero;
b) a dispersant of Formula (II):

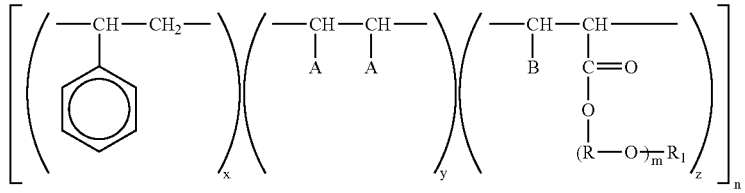

wherein in Formula (II):
A is COOM or optionally in the "y" structure an acid anhydride group (—CO—O—CO—) is formed in place of the A groups between the carbon atoms to which the A groups are bonded to form an anhydride;
B is COOM
M is hydrogen, a transition metal cation, the residue of a hydrophobic polyalkylene glycol or polysiloxane, an alkali metal ion, an alkaline earth metal ion, ferrous ion, aluminum ion, (alkanol)ammonium ion, or (alkyl)ammonium ion;
R is a $C_{2-6}$ alkylene radical;
R1 is a $C_{1-20}$ alkyl, $C_{6-9}$ cycloalkyl, or phenyl group;
x, y, and z are a number from 0.01 to 100;
m is a number from 1 to 100; and
n is a number from 10 to 100;
c) a dispersant comprising at least one polymer or a salt thereof having the form of a copolymer of
i) a maleic anhydride half-ester with a compound of the formula $RO(AO)_mH$, wherein R is a $C_1$-$C_{20}$ alkyl group, A is a $C_{2-4}$ alkylene group, and m is an integer from 2-16; and
ii) a monomer having the formula $CH_2$=$CHCH_2$—$(OA)_nOR$, wherein n is an integer from 1-90 and R is a $C_{1-20}$ alkyl group;
d) a dispersant obtained by copolymerizing 5 to 98% by weight of an (alkoxy)polyalkylene glycol mono(meth)acrylic ester monomer (a) represented by the following general formula (1):

wherein $R_1$ stands for hydrogen atom or a methyl group, $R_2O$ for one species or a mixture of two or more species of oxyalkylene group of 2 to 4 carbon atoms, providing two or more species of the mixture may be added either in the form of a block or in a random form, $R_3$ for a hydrogen atom or an alkyl group of 1 to 5 carbon atoms, and m is a value indicating the average addition mol number of oxyalkylene groups that is an integer in the range of 1 to 100, 95 to 2% by weight of a (meth)acrylic acid monomer (b) represented by the above general formula (2), wherein $R_4$ and $R_5$ are each independently a hydrogen atom or a methyl group, and $M_1$ for a hydrogen atom, a monovalent metal atom, a divalent metal atom, an ammonium group, or an organic amine group, and 0 to 50% by weight of other monomer (c) copolymerizable with these monomers, provided that the total amount of (a), (b), and (c) is 100% by weight;
e) a graft polymer that is a polycarboxylic acid or a salt thereof, having side chains derived from at least one species selected from the group consisting of oligoalkyleneglycols, polyalcohols, polyoxyalkylene amines, and polyalkylene glycols;
f) a dispersant of Formula (III):

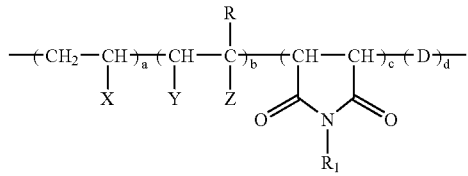

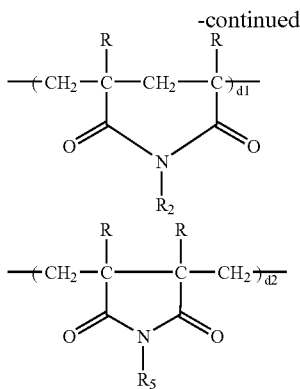

wherein in Formula (III):
D=a component selected from the group consisting of the structure d1, the structure d2, and mixtures thereof;
X=H, $CH_3$, $C_2$ to $C_6$ Alkyl, Phenyl, p-Methyl Phenyl, or Sulfonated Phenyl;
Y=H or —COOM;
R=H or $CH_3$;
Z=H, —$SO_3M$, —$PO_3M$, —COOM, —$O(CH_2)_nOR_3$ where n=2 to 6,
—$COOR_3$, or —$(CH_2)_nOR_3$ where n=0 to 6,
—$CONHR_3$, —$CONHC(CH_3)_2CH_2SO_3M$, —COO$(CHR_4)_nOH$ where n=2 to 6,
or —$O(CH_2)_nOR_4$ wherein n=2 to 6;
$R_1$, $R_2$, $R_3$, $R_5$ are each independently —$(CHRCH_2O)_mR_4$ random copolymer of oxyethylene units and oxypropylene units where m=10 to 500 and wherein the amount of oxyethylene in the random copolymer is from about 60% to 100% and the amount of oxypropylene in the random copolymer is from 0% to about 40%;
$R_4$=H, Methyl, $C_2$ to about $C_6$ Alkyl, or about $C_6$ to about $C_{10}$ aryl;
M=H, Alkali Metal, Alkaline Earth Metal, Ammonium, Amine, triethanol amine, Methyl, or $C_2$ to about $C_6$ Alkyl;
a=0 to about 0.8;
b=about 0.2 to about 1.0;
c=0 to about 0.5;
d=0 to about 0.5; and
wherein a, b, c, and d represent the mole fraction of each unit and the sum of a, b, c, and d is 1.0;
g) a dispersant of Formula (IV):

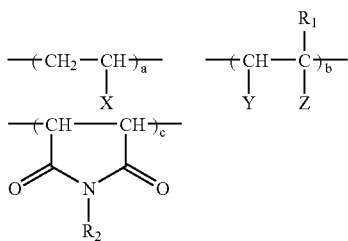

wherein in Formula (IV):
the "b" structure is one of a carboxylic acid monomer, an ethylenically unsaturated monomer, or maleic anhydride wherein an acid anhydride group (—CO—O—CO—) is formed in place of the groups Y and Z between the carbon atoms to which the groups Y and Z are bonded respectively, and the "b" structure must include at least one moiety with a pendant ester linkage and at least one moiety with a pendant amide linkage;
X=H, $CH_3$, $C_2$ to $C_6$ Alkyl, Phenyl, p-Methyl Phenyl, p-Ethyl Phenyl, Carboxylated Phenyl, or Sulfonated Phenyl;
Y=H, —COOM, —COOH, or W;
W=a hydrophobic defoamer represented by the formula $R_5O$—$(CH_2CH_2O)_s$—$(CH_2C(CH_3)HO)_t$—$(CH_2CH_2O)_u$ where s, t, and u are integers from 0 to 200 with the proviso that t>(s+u) and wherein the total amount of hydrophobic defoamer is present in an amount less than about 10% by weight of the polycarboxylate dispersant;
Z=H, —COOM, —$O(CH_2)_nOR_3$ where n=2 to 6, —$COOR_3$, —$(CH_2)_nOR_3$ where n=0 to 6, or —$CONHR_3$;
$R_1$=H, or $CH_3$;
$R_2$, $R_3$, are each independently a random copolymer of oxyethylene units and oxypropylene units of the general formula —$(CH(R_1)CH_2O)_mR_4$ where m=10 to 500 and wherein the amount of oxyethylene in the random copolymer is from about 60% to 100% and the amount of oxypropylene in the random copolymer is from 0% to about 40%;
$R_4$=H, Methyl, or $C_2$ to $C_8$ Alkyl;
$R_5$=$C_1$ to $C_{18}$ alkyl or $C_6$ to $C_{18}$ alkyl aryl;
M=Alkali Metal, Alkaline Earth Metal, Ammonia, Amine, monoethanol amine, diethanol amine, triethanol amine, morpholine, imidazole;
a=0.01-0.8;
b=0.2-0.99;
c=0-0.5; and
wherein a, b, c represent the mole fraction of each unit and the sum of a, b, and c, is 1;
h) a random copolymer corresponding to the following Formula (V) in free acid or salt form having the following monomer units and numbers of monomer units:

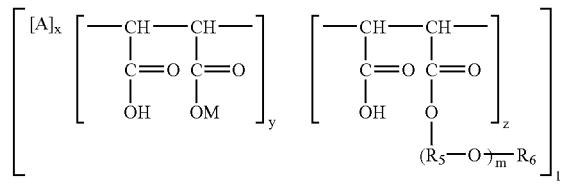

wherein A is selected from the moieties (i) or (ii)

(i) —$CR_1R_2$—$CR_3R_4$—
wherein $R_1$ and $R_3$ are selected from substituted benzene, $C_{1-8}$ alkyl, $C_{2-8}$ alkenyl, $C_{2-8}$ alkylcarbonyl, $C_{1-8}$ alkoxy, carboxyl, hydrogen, and a ring, $R_2$ and $R_4$ are selected from the group consisting of hydrogen and $C_{1-4}$ alkyl, wherein $R_1$ and $R_3$ can together with $R_2$ and/or $R_4$ when $R_2$ and/or $R_4$ are $C_{1-4}$ alkyl form the ring;

$R_7$, $R_8$, $R_9$, and $R_{10}$ are individually selected from the group consisting of hydrogen, $C_{1-6}$ alkyl, and a $C_{2-8}$ hydrocarbon chain, wherein $R_1$ and $R_3$ together with $R_7$ and/or $R_8$, $R_9$, and $R_{10}$ form the $C_{2-8}$ hydrocarbon chain joining the carbon atoms to which they are attached, the hydrocarbon chain optionally having at least one anionic group, wherein the at least one anionic group is optionally sulfonic;

M is selected from the group consisting of hydrogen, and the residue of a hydrophobic polyalkylene glycol or a polysiloxane, with the proviso that when A is (ii) and M is the residue of a hydrophobic polyalkylene glycol, M must be different from the group —$(R_5O)_mR_6$;

$R_5$ is a $C_{2-8}$ alkylene radical;

$R_6$ is selected from the group consisting of $C_{1-20}$ alkyl, $C_{6-9}$ cycloalkyl and phenyl;

n, x, and z are numbers from 1 to 100;

y is 0 to 100;

m is 2 to 1000;

the ratio of x to (y+z) is from 1:10 to 10:1 and the ratio of y:z is from 5:1 to 1:100;

i) a copolymer of oxyalkyleneglycol-alkenyl ethers and unsaturated dicarboxylic acids, comprising:
 i) 0 to 90 mol % of at least one component of the formula 3a or 3b:

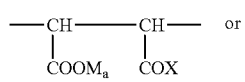

(3a)

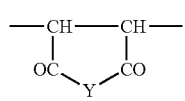

(3b)

wherein M is a hydrogen atom, a mono- or divalent metal cation, an ammonium ion or an organic amine residue, a is 1, or when M is a divalent metal cation a is ½;

wherein X is —$OM_a$,
 —O—$(C_mH_{2m}O)_n$—$R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
 —$NHR_2$,—$N(R^2)_2$ or mixtures thereof in which $R^2$=$R^1$ or —CO—$NH_2$; and wherein Y is an oxygen atom or —$NR^2$;

ii) 1 to 89 mol % of components of the general formula 4:

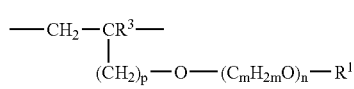

(4)

wherein $R_3$ is a hydrogen atom or an aliphatic hydrocarbon radical containing from 1 to 5 carbon atoms, p is 0 to 3, and $R_1$ is hydrogen, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulfonic substituted aryl radical containing 6 to 14 carbon atoms, m is 2 to 4, and n is 0 to 100, and iii) 0.1 to 10 mol % of at least one component of the formula 5a or 5b:

(5a)

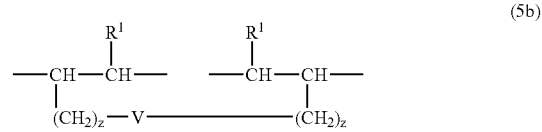

(5b)

wherein S is a hydrogen atom or —$COOM_a$ or —$COOR_5$, T is —$COOR_5$, —W—$R_7$, —CO—[—NH—(CH2)3)-]$_s$-W—$R_7$, —CO—O—$(CH_2)_z$—W—$R_7$, a radical of the general formula:

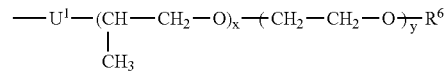

or —$(CH_2)_z$—V—$(CH_2)_z$—CH=CH—$R_1$, or when S is —$COOR_5$ or —$COOM_a$, $U_1$ is —CO—NHM-, —O— or —$CH_2O$, $U_2$ is —NH—CO—, —O— or —$OCH_2$, V is —O—CO—$C_6H_4$—CO—O— or —W—, and W is

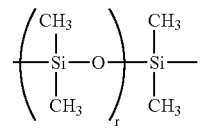

$R4$ is a hydrogen atom or a methyl radical, $R5$ is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R_6$=$R_1$ or

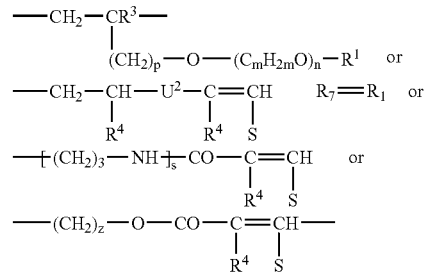

r is 2 to 100, s is 1 or 2, x is 1 to 150, y is 0 to 15 and z is 0 to 4;

iv) 0 to 90 mol % of at least one component of the formula 6a, 6b, or 6c:

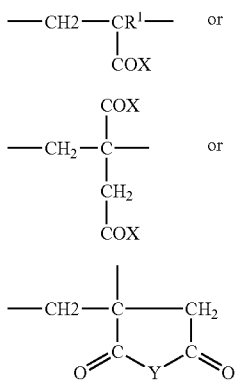

(6a)

(6b)

(6c)

wherein M is a hydrogen atom, a mono- or divalent metal cation, an ammonium ion or an organic amine residue, a is 1, or when M is a divalent metal cation a is ½;

wherein X is $-OM_a$,
  $-O-(C_mH_{2m}O)_n-R^1$ in which $R^1$ is a hydrogen atom, an aliphatic hydrocarbon radical containing from 1 to 20 carbon atoms, a cycloaliphatic hydrocarbon radical containing 5 to 8 carbon atoms or an optionally hydroxyl, carboxyl, $C_{1-14}$ alkyl, or sulphonic substituted aryl radical containing 6 to 14 carbon atoms, m is 2 to 4, and n is 0 to 100,
  $-NH-(C_mH_{2m}O)_n-R^1$,
  $-NHR_2, -N(R^2)_2$ or mixtures thereof in which $R^2=R^1$ or
  $-CO-NH_2$; and wherein Y is an oxygen atom or $-NR^2$;

j) a copolymer of dicarboxylic acid derivatives and oxyalkylene glycol-alkenyl ethers, comprising:
  i) 1 to 90 mol. % of at least one member selected from the group consisting of structural units of formula 7a and formula 7b:

(7a)

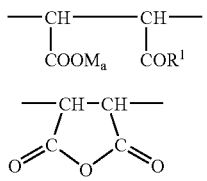

(7b)

wherein M is H, a monovalent metal cation, a divalent metal cation, an ammonium ion or an organic amine;
a is ½ when M is a divalent metal cation or 1 when M is a monovalent metal cation;
wherein $R^1$ is $-OM_a$, or
  $-O-(C_mH_{2m}O)_n-R^2$ wherein $R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;
m is 2 to 4;
n is 1 to 200;

ii) 0.5 to 80 mol. % of the structural units of formula 8:

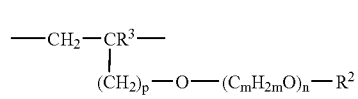

(8)

wherein $R^3$ is H or a $C_{1-5}$ aliphatic hydrocarbon;
p is 0 to 3;
$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;
m is 2 to 4;
n is 1 to 200;

iii) 0.5 to 80 mol. % structural units selected from the group consisting of formula 9a and formula 9b:

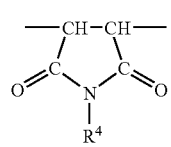

(9a)

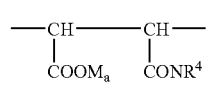

(9b)

wherein $R^4$ is H, $C_{1-20}$ aliphatic hydrocarbon that is optionally substituted with at least one hydroxyl group, $-(C_mH_{2m}O)_n-R^2$, $-CO-NH-R^2$, $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;
M is H, a monovalent metal cation, a divalent metal cation, an ammonium ion or an organic amine;
a is ½ when M is a divalent metal cation or 1 when M is a monovalent metal cation;
$R^2$ is H, a $C_{1-20}$ aliphatic hydrocarbon, a $C_{5-8}$ cycloaliphatic hydrocarbon, or a $C_{6-14}$ aryl that is optionally substituted with at least one member selected from the group consisting of $-COOM_a$, $-(SO_3)M_a$, and $-(PO_3)M_{a2}$;
m is 2 to 4;
n is 1 to 200;

iv) 1 to 90 mol. % of structural units of formula 10

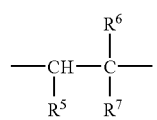

(10)

wherein $R^5$ is methyl, or methylene group, wherein $R^5$ forms one or more 5 to 8 membered rings with $R^7$;
$R^6$ is H, methyl, or ethyl;
$R^7$ is H, a $C_{1-20}$ aliphatic hydrocarbon, a $C_{6-14}$ aryl that is optionally substituted with at least one member selected from the group consisting of —COOM$_a$, —(SO$_3$)M$_a$, and —(PO$_3$)M$_{a2}$, a C$_{5-8}$ cycloaliphatic hydrocarbon, —OCOR$^4$, —OR$^4$, and —COOR$^4$, wherein R$^4$ is H, a C$_{1-20}$ aliphatic hydrocarbon that is optionally substituted with at least one —OH, —(C$_m$H$_{2m}$O)$_n$—R$^2$, —CO—NH—R$^2$, C$_{5-8}$ cycloaliphatic hydrocarbon, or a C$_{6-14}$ aryl residue that is optionally substituted with a member selected from the group consisting of —COOM$_a$, —(SO$_3$)M$_a$, and —(PO$_3$)M$_{a2}$.

* * * * *